(12) United States Patent
Rahmani et al.

(10) Patent No.: US 10,698,293 B2
(45) Date of Patent: Jun. 30, 2020

(54) FREQUENCY CONVERSION OF ELECTROMAGNETIC RADIATION

(71) Applicant: The Australian National University, Australian Capital Territory (AU)

(72) Inventors: Mohsen Rahmani, Australian Capital Territory (AU); Dragomir N. Neshev, Australian Capital Territory (AU); Hark Hoe Tan, Australian Capital Territory (AU); Chennupati Jagadish, Australian Capital Territory (AU); Yuri Kivshar, Australian Capital Territory (AU); Fouad Karouta, Australian Capital Territory (AU)

(73) Assignee: The Australian National University, Australian Capital Territory (AU)

( * ) Notice: Subject to any disclaimer, the term of this patent is extended or adjusted under 35 U.S.C. 154(b) by 0 days.

(21) Appl. No.: 15/594,291

(22) Filed: May 12, 2017

(65) Prior Publication Data
US 2018/0329273 A1 Nov. 15, 2018

(51) Int. Cl.
*G02F 1/37* (2006.01)
*G02F 1/355* (2006.01)

(52) U.S. Cl.
CPC .............. *G02F 1/37* (2013.01); *G02F 1/3556* (2013.01); *G02F 2203/11* (2013.01)

(58) Field of Classification Search
CPC ....... G02F 1/3556; G02F 1/37; G02F 2203/11
See application file for complete search history.

(56) References Cited

U.S. PATENT DOCUMENTS

| 5,113,473 A | * | 5/1992 | Yoshida | G02F 1/355 204/192.1 |
| 5,543,354 A | * | 8/1996 | Richard | B82Y 20/00 117/105 |
| 6,528,339 B1 | * | 3/2003 | Goldstein | B82Y 20/00 216/2 |

(Continued)

FOREIGN PATENT DOCUMENTS

| JP | 03028831 A | * | 2/1991 | ............. B82Y 20/00 |
| WO | WO 2008/046147 A1 | | 4/2008 | |

OTHER PUBLICATIONS

Hugonin et al., "RETICOLO Code for the diffraction by stacks of lamellar gratings"; Institut d'Optique; Orsay, France; 2005 (updated 2013); 56 pages.

*Primary Examiner* — Daniel Petkovsek
(74) *Attorney, Agent, or Firm* — Knobbe, Martens, Olson & Bear, LLP

(57) ABSTRACT

A frequency conversion device and method is disclosed. In one aspect, a frequency device includes an array of mutually spaced semiconductor islands composed of at least one III-V semiconductor compound. The semiconductor islands are configured so that electromagnetic radiation of a first wavelength incident upon the semiconductor islands causes them to emit electromagnetic radiation of a second wavelength shorter than the first wavelength by a nonlinear frequency conversion process. The frequency device further includes a transparent support supporting the semiconductor islands. The transparent support is substantially transparent to radiation of the second wavelength, so that at least the radiation of the second wavelength passes through the transparent support.

22 Claims, 22 Drawing Sheets

(56) References Cited

U.S. PATENT DOCUMENTS

| | | | | |
|---|---|---|---|---|
| 6,541,788 | B2* | 4/2003 | Petroff | B82Y 10/00 257/12 |
| 6,751,243 | B2* | 6/2004 | Mukai | B82Y 20/00 257/14 |
| 6,958,853 | B1* | 10/2005 | Arnone | B82Y 20/00 359/326 |
| 6,995,371 | B2* | 2/2006 | Garber | B82Y 20/00 136/255 |
| 7,560,707 | B2* | 7/2009 | Bratkovski | B82Y 20/00 250/458.1 |
| 10,054,839 | B1* | 8/2018 | Brener | G02F 1/353 |
| 2002/0162995 | A1 | 11/2002 | Petroff et al. | |
| 2011/0002574 | A1* | 1/2011 | Bermel | B82Y 20/00 385/3 |
| 2015/0369989 | A1* | 12/2015 | Hsu | G02B 6/0073 349/65 |
| 2017/0309797 | A1* | 10/2017 | De Boer | H01L 33/507 |

* cited by examiner

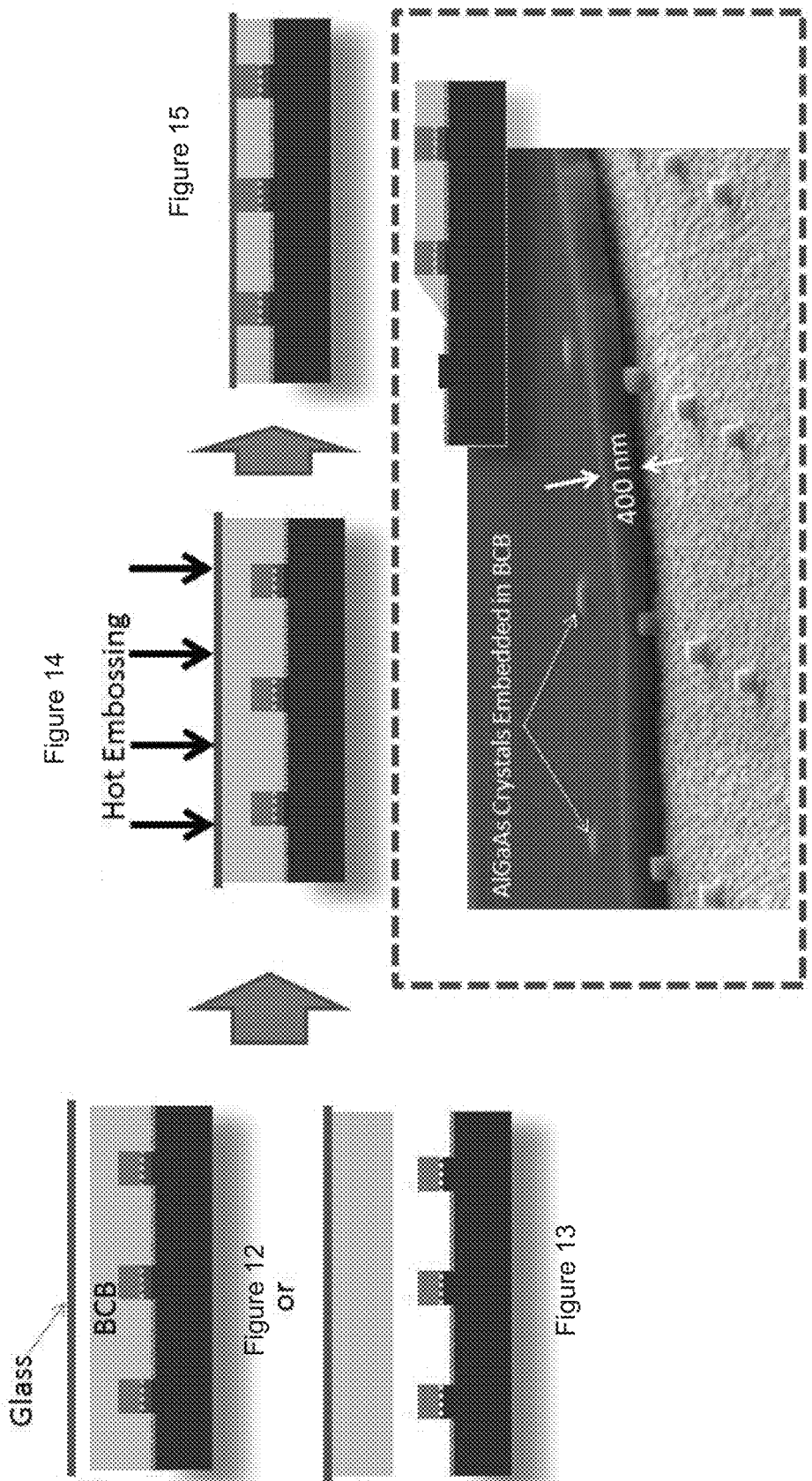

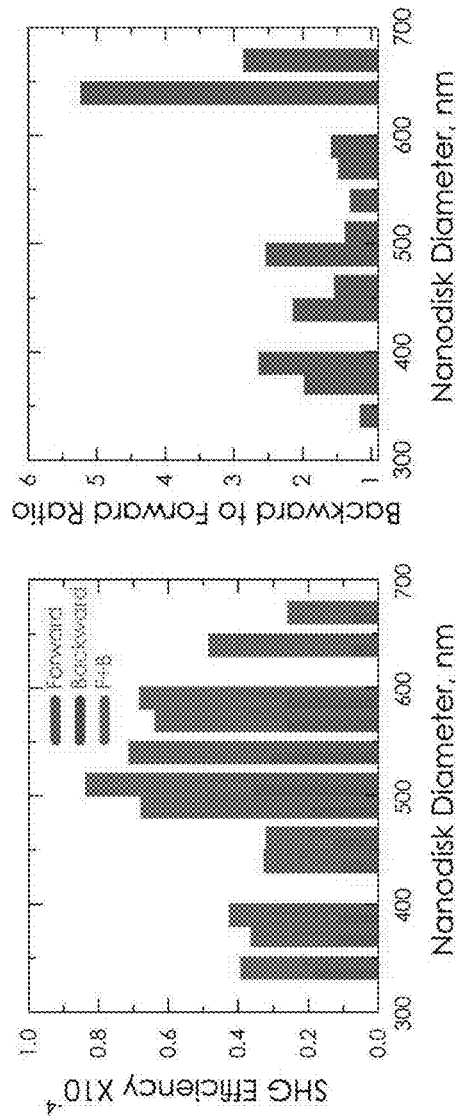
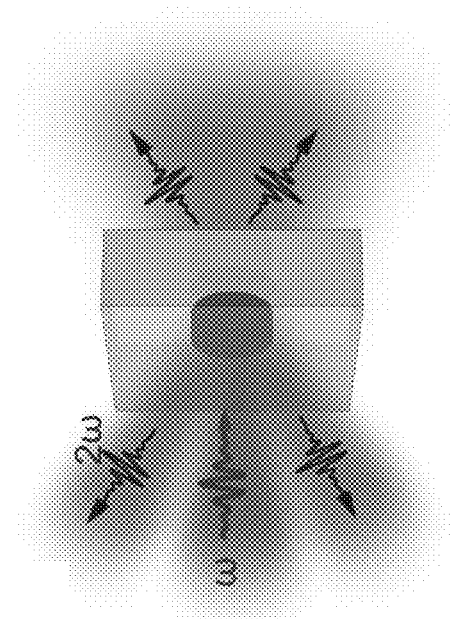
Figure 24
Figure 25
Figure 26

FREQUENCY CONVERSION OF ELECTROMAGNETIC RADIATION

BACKGROUND

Technological Field

The disclosed technology relates to frequency/wavelength conversion of non-ionising electromagnetic radiation, and in particular to a frequency conversion device, a frequency conversion process, and a process for producing a frequency conversion device.

Description of the Related Technology

There are many applications that require or at least benefit from the conversion of non-ionising electromagnetic radiation from one frequency/wavelength to a different frequency/wavelength, including imaging and detection applications. For example, night vision and thermal imaging devices are able to generate images in the visible light region from ambient or artificial radiation in the infrared region. However, despite the advantageous capabilities of existing frequency/wavelength conversion devices, there is a need to improve their performance. For applications including night vision equipment, there is a need to reduce bulkiness.

SUMMARY OF CERTAIN INVENTIVE ASPECTS

The innovations described in the claims each have several aspects, no single one of which is solely responsible for its desirable attributes. Without limiting the scope of the claims, some prominent features of this disclosure will now be briefly described.

One aspect is a frequency conversion device. The frequency conversion device includes an array of mutually spaced semiconductor islands formed of at least one III-V semiconductor compound and configured so that electromagnetic radiation of a first wavelength incident upon the semiconductor islands causes them to emit electromagnetic radiation of a second wavelength shorter than the first wavelength by a nonlinear frequency conversion process. The frequency device further includes a transparent support that supports the semiconductor islands. The transparent support is substantially transparent to radiation of the second wavelength. At least the radiation of the second wavelength passes through the transparent support.

In some embodiments, the semiconductor islands are at least partially embedded in the transparent support. In some embodiments, the transparent support includes a transparent substrate attached to a layer of a transparent material in which the semiconductor islands are at least partially embedded. In some embodiments, the transparent substrate and the transparent material are both substantially transparent to radiation of the first wavelength and to radiation of the second wavelength.

In some embodiments, the refractive index of the transparent substrate is equal to or approximately equal to the refractive index of the transparent material. In some embodiments, the refractive index of the transparent substrate is different to the refractive index of the transparent material. In some embodiments, the transparent substrate is a glass and the transparent material is a polymer.

In some embodiments, the radiation of the second wavelength is simultaneously emitted in a forward direction and a backward direction relative to the direction of incidence of the radiation of the first wavelength. The semiconductor islands may be configured to support Mie resonances at the first and/or second wavelengths.

In some embodiments, the radiation of the first wavelength is infrared radiation, and the radiation of the second wavelength is visible light.

In some embodiments, the semiconductor islands are in the form of cylinders with diameters and/or heights of the order of hundreds of nanometers.

Another aspect is a night vision device including of any one of the above frequency conversion devices.

Another aspect is a method of manufacturing a frequency conversion device. The method includes forming, on a substrate, an array of mutually spaced semiconductor islands composed of at least one III-V semiconductor compound. The semiconductor islands are of nanometer-scale and configured so that radiation of a first wavelength incident upon the semiconductor islands causes them to emit radiation of a second wavelength shorter than the first wavelength by a nonlinear frequency conversion process. The substrate is substantially opaque to electromagnetic radiation of the second wavelength. The method further includes attaching the semiconductor islands to a transparent support that is substantially transparent to radiation of the second wavelength to provide a frequency conversion device. The array of mutually spaced nanometer-scale semiconductor islands is supported by the transparent support so that radiation of the first wavelength incident upon the frequency conversion device causes it to emit radiation of the second wavelength. At least the radiation of the second wavelength passes through the transparent support.

In some embodiments, the process includes removing the substrate from the semiconductor islands.

In some embodiments, the semiconductor islands are at least partially embedded in the transparent support.

In some embodiments, the transparent support includes a transparent substrate attached to a layer of a transparent material in which the semiconductor islands are at least partially embedded. In some embodiments, the transparent substrate is a glass or $MgF_2$ or $BaF_2$ substrate, and the transparent material is a polymer.

Another aspect is a method of frequency conversion. The method includes directing radiation of a first wavelength onto an array of mutually spaced III-V compound semiconductor islands supported by a transparent support to cause the array to emit radiation of a second wavelength shorter than the first wavelength by a nonlinear frequency conversion process. At least the radiation of the second wavelength passes through the transparent support.

BRIEF DESCRIPTION OF THE DRAWINGS

Some embodiments of the disclosed technology are hereinafter described, by way of example only, with reference to the accompanying drawings.

FIGS. 12 to 15 are schematic side-views illustrating the formation of a transparent substrate on the semiconductor islands using a hot embossing step.

FIG. 16 includes an SEM image of a test sample to illustrate the relationship between a polymer (BCB in this example) embedding layer, the semiconductor islands, and the original substrate (prior to its removal).

FIG. 24 is a schematic illustration of the nonlinear spectroscopy of single semiconductor islands.

FIG. 25 is a bar chart of experimentally measured second harmonic generation (SHG) efficiency ($P_{SH}/P_{FW}$) from single semiconductor islands of different diameters at the pump wavelength of 1556 nm, where blue indicates forward radiation, red indicates backward radiation, and green indicates the sum of forward and backward.

FIG. 26 is a bar chart of the backward-to-forward ratio of the second harmonic as a function of island diameter.

DETAILED DESCRIPTION OF CERTAIN EMBODIMENTS

Figure 1:
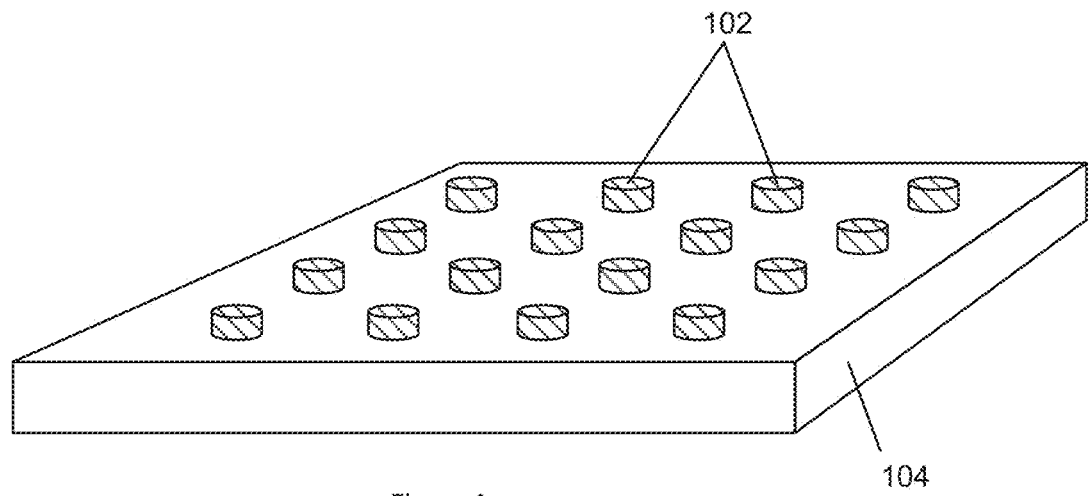
FIGS. 1 and 2 are perspective and side views, respectively, of a frequency conversion device in accordance with some embodiments of the disclosed technology, including an array of III-V semiconductor islands on a transparent support and configured for nonlinear frequency conversion.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

Figure 2:
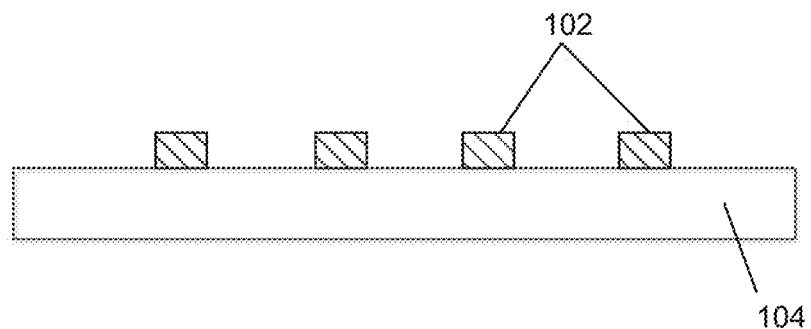
Figure 3:
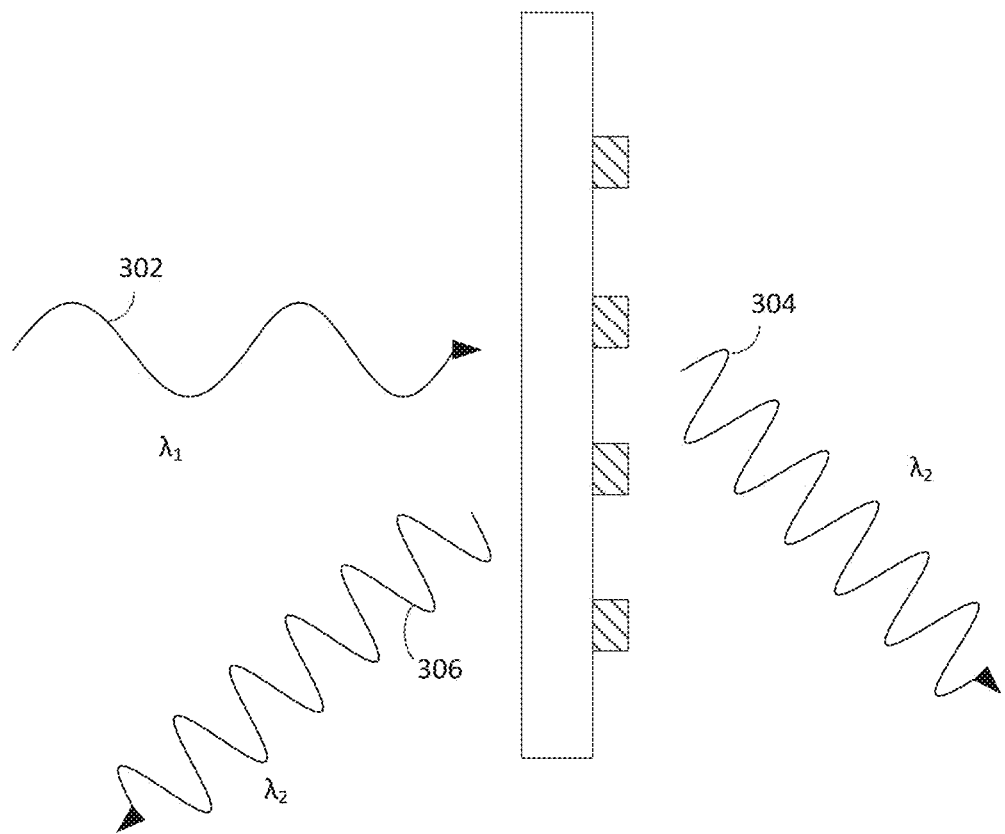
FIG. 3 illustrates one mode of operation of the frequency conversion device of FIGS. 1 and 2, wherein radiation of a first wavelength incident upon the islands causes them to emit output radiation of a second wavelength shorter than the first wavelength by a non-linear frequency conversion process.

As shown in FIGS. 1 and 2, a frequency conversion device includes an array of mutually spaced semiconductor bodies or islands 102 supported by a transparent support 104. Although the shape of the islands 102 in plan view is typically circular as shown, they can alternatively be performed with essentially any desired shape. The islands 102 are composed of at least one III-V compound semiconductor, and are configured so that electromagnetic radiation 302 of a first wavelength $\lambda_1$ incident upon the semiconductor islands 102 causes them to emit electromagnetic radiation 304, 306 of a second wavelength $\lambda_2$ that is shorter than the first wavelength, as shown in FIG. 3, by way of a nonlinear frequency conversion process.

Compound semiconductors formed from combinations of elements from groups iii and V of the periodic table (referred to in the art as "III-V semiconductors") are used because they have relatively large quadratic non-linear electromagnetic properties. In contrast, elemental semiconductors such as Si and Ge do not exhibit bulk quadratic nonlinearity due to their centro-symmetric crystalline structure.

The property of the support described as "transparent" in the context of this specification should be understood as meaning that the support is substantially transparent to radiation of the second wavelength. In some embodiments, the support is also substantially transparent to radiation of the first wavelength. As will be understood by those skilled in the art, in practice no medium is completely transparent, and there will always be at least a small degree of loss when electromagnetic radiation passes through a medium, hence when the support is described herein as being transparent, it will be understood that this does not require the support to be completely transparent with zero insertion loss.

In any case, the transparency of the support allows at least one of the radiation of the first wavelength and the radiation of the second wavelength to pass through the transparent support. However, in some embodiments, the emitted electromagnetic radiation can include radiation emitted in a direction that is emitted at an angle of more than 90° relative to the direction of incidence of the radiation of the first wavelength, as shown by 306 in FIG. 3.

Figure 3A:
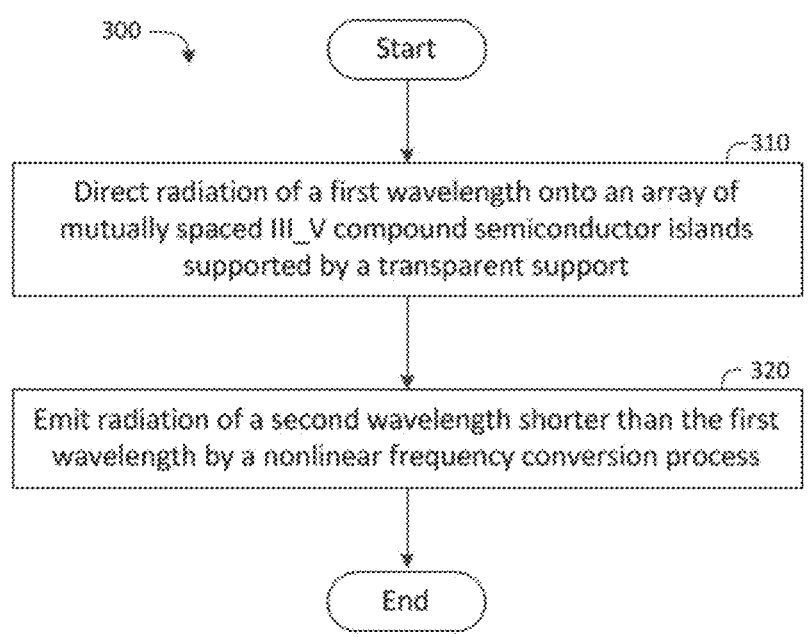
FIG. 3A is a flowchart of a method of frequency conversion according to the mode of operation of FIG. 3.

FIG. 3A is a flowchart of a method 300 of frequency conversion according to the mode of operation of FIG. 3. In block 310, method 300 directs radiation of a first wavelength onto an array of mutually spaced III-V compound semiconductor islands 102 supported by a transparent support 104. Iii block 320, method 300 causes the array to emit radiation of a second wavelength shorter than the first wavelength by a nonlinear frequency conversion process, in which at least the radiation of the second wavelength passes through the transparent support.

The values of the first and second wavelengths are determined by the composition of the compound semiconductor islands and their physical dimensions, allowing the semiconductor islands to be configured so that the values of the first and second wavelengths suit a particular application of interest. However, the composition of the compound semiconductor is chosen to support a nonlinear frequency conversion process, such as a harmonic generation process that effectively blue-shifts the incident radiation of the first wavelength to the output radiation of the second wavelength that is shorter than the first wavelength. In the described embodiments, the nonlinear frequency conversion process is a harmonic generation process; however, it will be apparent to those skilled in the art that other nonlinear interactions can be used in other embodiments to generate output radiation of the second wavelength that is shorter than the first wavelength.

The semiconductor islands can be formed of any compound semiconductor provided that the lattice mismatch between the crystalline semiconductor and the corresponding transparent crystalline substrate is not so large that it causes high concentrations of defects in the semiconductor that effectively render the frequency conversion processes ineffective in a practical sense. Examples of such compounds include those based on GaN, GaSb, GaAs, InP, InAs and InGaAs. For example, the semiconductor islands may be composed of $Al_xGa_{(1-x)}As$ or $In_xGa_{(1-x)}As$ with $x \in [0, 1]$. The orientation of the substrate (and thus the semiconductor islands epitaxially grown on the substrate) is typically a major crystallographic orientation such as [100], [110], or [111].

Figure 4:
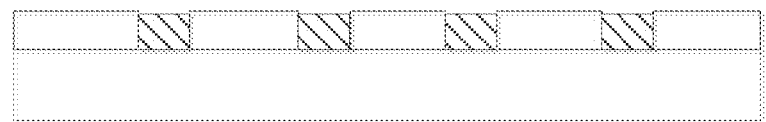
FIGS. 4 and 5 are schematic side-views of respective further embodiments in which the semiconductor islands are partially or completely embedded in a transparent support.
Figure 5:
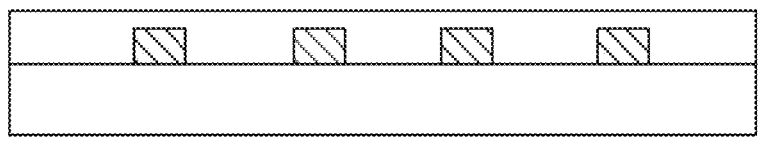
Figure 6:
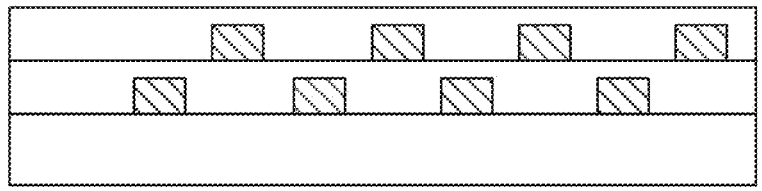
FIG. 6 is a schematic side view of yet a further embodiment in which multiple layers of semiconductor islands are embedded in a transparent support.

The semiconductor islands can be freestanding and not embedded in the transparent support, as shown in FIGS. 1 and 2, or partially embedded, as shown in FIG. 4, or completely embedded in the transparent support, as shown in FIG. 5. In some embodiments, the array of semiconductor islands is a three-dimensional array, as shown in FIG. 6. Although FIG. 6 shows such an array as a stack of two layers of two-dimensional arrays of semiconductor islands, in other embodiments this stacking can be continued to provide a stack with three or more layers. The different layers can include islands composed of different compound semiconductors. Additionally, the semiconductor islands in each of the stacked layers can be completely embedded, as shown in FIG. 6, partially embedded, or not embedded. Additionally, the pitch and/or relative alignment of semiconductor islands in different layers can be arranged in a wide variety of different ways.

The frequency conversion devices described herein are thus able to up-convert or blue-shift non-ionizing electromagnetic radiation at a wide range of input wavelengths and output wavelengths, as determined by the configuration of the individual compound semiconductor islands. Accordingly, by providing islands of different composition and/or physical dimensions in a single two-dimensional array or three-dimensional array, a single frequency conversion device as described herein can provide conversion over a wide range of desired input and/or output wavelengths.

In particular, where the described compound semiconductor islands are configured to blue-shift incident infrared radiation, a frequency conversion device as described herein can be used for thermal imaging or night vision. In some embodiments, the blue-shifting produces light at wavelengths in the visible wavelength region. In any case, by including compound semiconductor islands of different configurations selected to blue-shift different wavelengths of infrared radiation to respective different wavelengths of visible light, a color representation of objects having different temperatures and/or emissivities can be generated, either directly (if the output wavelengths are in the visible region), or indirectly (in all cases) via standard amplification and image generation methods known to those skilled in the art (including those currently used in existing thermal imaging and night vision equipment).

Fabrication of Non-Linear Electromagnetic Devices

Figure 7:
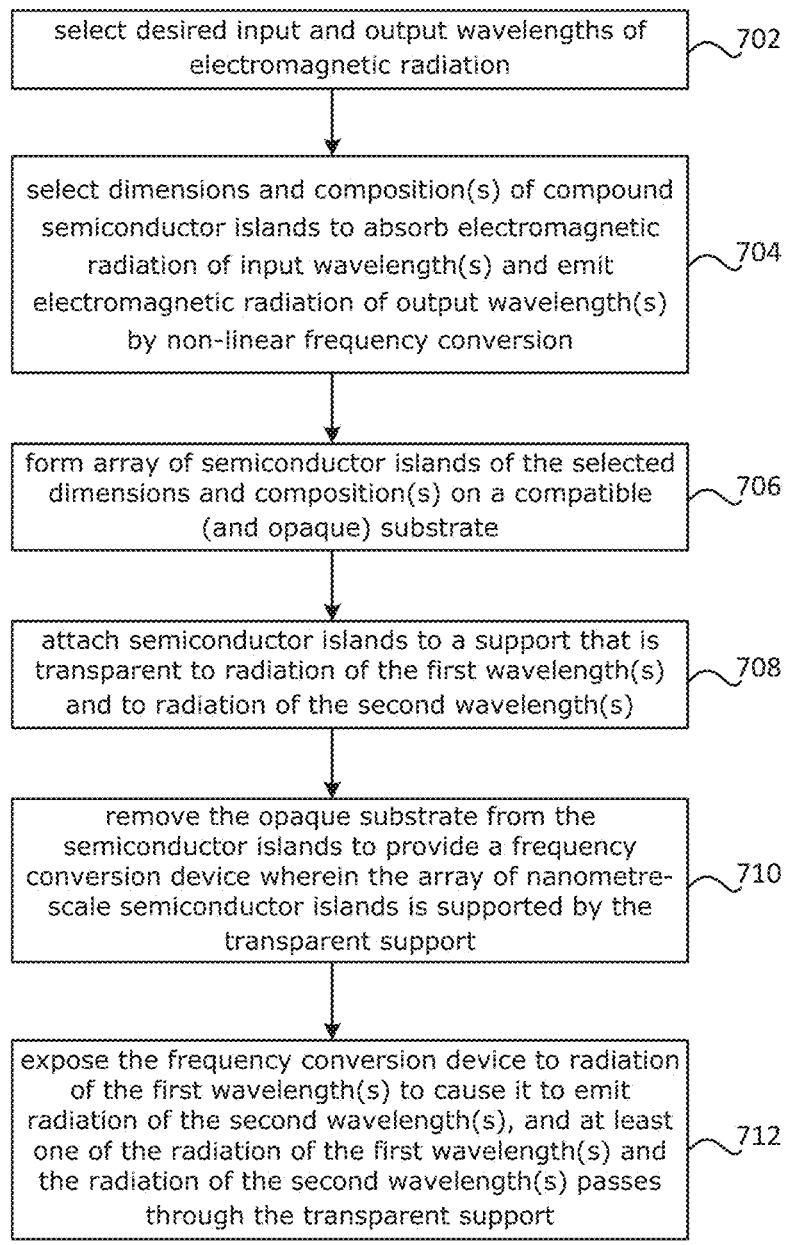
FIG. 7 is a flowchart of an embodiment of a method of manufacturing a frequency conversion device.

The frequency conversion devices described herein can be manufactured by a production process such as that shown in FIG. 7. The process begins at step 702 by selecting at least one desired input (or "first") wavelength and at least one desired output (or "second") wavelength. As described above, these wavelengths will generally be determined by the specific application for which the frequency conversion device is to be applied. In the described embodiments, the frequency conversion device is to be used for night vision or thermal imaging, and accordingly the first wavelengths are in the infrared region of the electromagnetic spectrum (and are about 10 μm or less), and the second wavelengths are in the visible region of the electromagnetic spectrum.

Having chosen the input and output wavelengths, at step 704, these are used to determine at least one corresponding configuration of the compound semiconductor islands, in particular the composition(s) and physical dimensions of the islands to support those wavelengths.

In the described embodiments, the semiconductor islands are in the form of cylinders composed of compound semiconductors with compositions of $Al_x Ga_{(1-x)}As$ or $In_x Ga_{(1-x)}As$, with $x \in [0, 1.0]$ or alloys thereof, i.e., ranging from GaAs to AlAs, InAs or InGaAs. In the case of $In_x Ga_{(1-x)}As$ compounds, it is found that islands composed of $In_{0.53}Ga_{0.47}As$ provide the best performance, as it provides the smallest lattice mismatch with the InP substrate, and consequently produces the lowest defect density.

In the described embodiments, the dimensions of the islands are nanometer-scale ('nanoscale') dimensions of about 20 nm-10 μm). Appropriate physical dimensions for a given desired wavelength and compound semiconductor composition can be determined by simulation, using a computational electromagnetics software package such as COMSOL Multiphysics®.

At step 706, an array of compound semiconductor islands of the selected dimensions and composition are formed on a crystalline substrate that is compatible with epitaxial growth of the selected compound semiconductor. For example, in the case of $Al_x Ga_{(1-x)}As$ compounds, the substrate can be a single-crystal GaAs wafer, and in the case of $In_x Ga_{(1-x)}As$ compounds, the substrate can be a single-crystal InP wafer. Unfortunately, compatible substrates have high refractive indices and are opaque to electromagnetic radiation in the wavelength ranges of interest (e.g., in the visible region). Growth of compound semiconductors on transparent substrates such as glass results in a high density of dislocations in the grown semiconductors, and therefore poor characteristics.

Typically, the formation step 706 involves standard semiconductor processing steps known to those skilled in the art, including epitaxial growth of a layer of the corresponding compound semiconductor on an opaque semiconductor substrate (possibly preceded by an intermediate or buffer layer, as described below), followed by deposition of a mask layer, patterning of the mask layer by lithography, selected area etching of the compound semiconductor layer, and removal of the remaining mask material. The specific details of the steps required to form compound semiconductor islands of a desired configuration are well within the capabilities of those of ordinary skill in the art.

In some embodiments, the semiconductor islands are at least partially decoupled from the substrate in order to weaken their attachment to the substrate. This can be achieved by growing an intermediate layer on the substrate, prior to growing the compound semiconductor from which the islands will be formed, with the intermediate layer being formed of a material that can be selectively removed in order to decouple the overlying semiconductor islands. Residual (but relatively weak) coupling forces (including Van der Waals forces) maintain the semiconductor islands at their originals locations. For example, where the semiconductor islands are composed of $Al_x Ga_{(1-x)}As$ compounds with $x \in [0, \approx 0.8]$, AlAs can be used as the intermediate layer as it is preferentially etched by HCl.

In all cases, having formed the compound semiconductor islands on the opaque substrate, at step 708 they are bonded to a transparent support, and at step 710 the opaque substrate is removed to provide the frequency conversion device in the form of mutually spaced semiconductor islands supported by the transparent substrate. In embodiments where the semiconductor islands have been decoupled, the opaque substrate can be removed by simply pulling it away from the semiconductor islands, because the decoupling step causes the bonding between these to be weaker than the bonding between the semiconductor islands and the transparent support. Otherwise, in the absence of the decoupling step, the opaque substrate can be removed by etching, for example. In the case of $In_x Ga_{(1-x)}As$ compounds on an InP substrate, for example, the substrate can be preferentially removed by HCl acid. In the case of AlAs compounds on a GaAs substrate, for example, the substrate can be preferentially removed by a citric acid/$H_2O_2$ solution.

As described above, the resulting frequency conversion device can be used at step 712 to blue-shift electromagnetic radiation.

Incidentally, although it would be possible to transfer the compound semiconductor layer to a transparent (e.g., glass) substrate and then pattern the bonded layer to form mutually spaced islands of the compound semiconductor, in practice due to poor adhesion and fragility of the transferred layer, it is not generally possible to form the islands in this way with high spatial resolution and smooth surfaces and edges, which are required characteristics to achieve high non-linear conversion performance.

Some embodiments of the disclosed technology are now described in the context of frequency conversion devices configured to convert infrared radiation to visible radiation for thermal imaging or night vision applications. In these embodiments, the compound semiconductor composition was chosen to be $Al_{0.2}Ga_{0.8}As$ of [100] crystallographic orientation normal to the plane of a two-dimensional array of islands of this compound, and the semiconductor islands were chosen to be cylinders or disks having various diameters in the range of 340-690 nm and a fixed height of about 300 nm so that the semiconductor islands would support Mie-type resonances at the input and output wavelengths (since the frequency conversion frequency is maximized when the semiconductor islands are resonant at both the input and output wavelengths). In the described embodiment, the islands were arranged on a square grid at a pitch or periodicity of 5 μm. However, in general, the islands can be arranged in any manner, including hexagonal lattice arrangements for high packing density, quasi-random arrangements, and arrangements that provide diffraction of the output radiation (e.g., to excite Fano resonances and enhance efficiency). For comparison, some arrays of islands of the same composition were formed at a pitch of 1 μm.

A 20 nm AlAs sacrificial buffer layer was epitaxially grown on [100] GaAs wafers by metal-organic chemical vapor deposition (MOCVD), followed by a 300 nm layer of $Al_{0.2}Ga_{0.8}As$, and finally a 5 nm GaAs capping layer to prevent oxidation of the $Al_{0.2}Ga_{0.8}As$. A 400 nm $SiO_x$ masking layer was then deposited over the $Al_{0.2}Ga_{0.8}As$ by plasma-enhanced chemical vapor deposition (PECVD). The mask layer was then patterned using electron-beam lithography and reactive ion etching using $Cl_2$, Ar and $H_2$ gases to remove all of the masking layer except for a square array of circular regions having the pitch and diameters indicated above.

Figure 8:
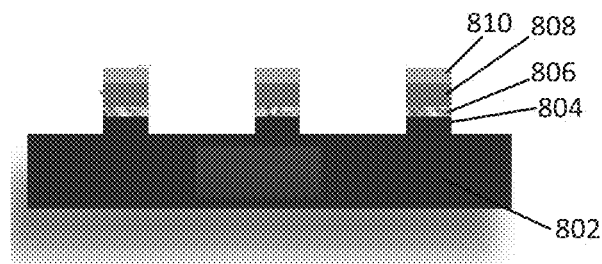
FIGS. 8 to 11 include schematic side-views of partially fabricated frequency conversion devices at different steps of the production process of FIG. 7, together with corresponding scanning electron microscope (SEM) images showing details of the semiconductor islands.
Figure 9:
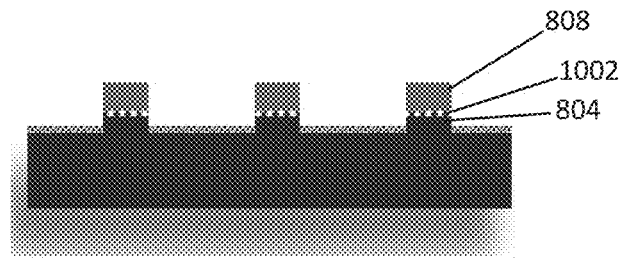

The compound semiconductor regions exposed by the circular openings in the mask layer were then etched in an inductively coupled plasma (ICP) etching tool to remove all of the epitaxially grown compound semiconductors and a small amount of the GaAs substrate. As shown in the schematic diagram of FIG. 8 and the scanning electron microscope (SEM) image of FIG. 9, the resulting structure consists of the remaining GaAs substrate 802 with cylindrical pillars formed of layers of GaAs 804, AlAs 806, $Al_{0.2}Ga_{0.8}As$ 808, and $SiO_2$ 810. In the described embodiment, the etching was performed in a plasma etching tool using $Cl_2$, Ar, and $H_2$ gases. Although other process gases and/or subtractive methods (e.g., ion-milling) can be used to achieve the same structure, the use of $Cl_2$ as a purging gas results in a non-adhesive surface and thus assists with the subsequent removal of the semiconductor islands from the substrate, as described below.

Figure 10:
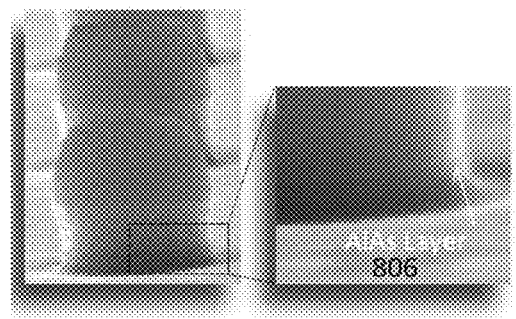
Figure 11:
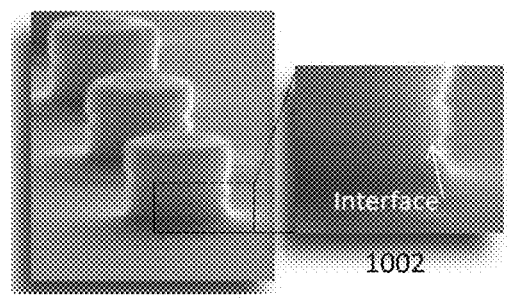

The $SiO_2$ layer 810 and the AlAs layer 806 are then removed from each pillar by wet etching in 2% HF to produce the structure shown in the schematic diagram of FIG. 10 and the SEM image of FIG. 11, wherein the removal of the AlAs layer 806 produces an interface (represented by the dotted line 1002 in FIG. 10) between the GaAs layer 804 and the $Al_{0.2}Ga_{0.8}As$ layer 808. As described above, if the AlAs layer 806 is completely removed (as shown in the SEM image of FIG. 11), van der Waals forces keep the $Al_{0.2}Ga_{0.8}As$ layer 808 in place; otherwise, if the AlAs layer 806 is not completely removed, then any remaining part of that layer 806 can act to maintain the $Al_{0.2}Ga_{0.8}As$ layer 808 in place.

After this step, the $Al_{0.2}Ga_{0.8}As$ layer/disks 808 are attached to a transparent support. In the described embodiments, the transparent support is a composite structure or assembly consisting of a transparent polymer on a planar transparent substrate/superstrate. In some embodiments, the transparent support is formed and attached by spin-coating a thin (4 μm in some embodiments) polymer layer on the sample, curing the polymer, and bonding it to a thin transparent substrate/superstrate, as shown in FIG. 12. The thickness of the polymer layer can then be reduced, typically but not necessarily to the height of the semiconductor islands by a hot embossing step, wherein the polymer layer is heated and made to flow around the semiconductor islands by applying pressure to the superstrate as shown in FIG. 14 to produce the structure shown in FIG. 15. For the purposes of illustration, the SEM image of FIG. 16 shows an array of $Al_{0.2}Ga_{0.8}As$ islands, some of which are embedded in a BCB polymer layer of the same (400 nm) height/thickness.

As an alternative, in some embodiments the attachment is achieved by first bonding the polymer and superstrate layers, and then attaching the resulting composite support to the semiconductor islands, as shown in FIG. 13, before performing the hot embossing step described above and shown in FIG. 14.

In either case, the hot embossing step can also be used to simultaneously cure the polymer. For example, where the polymer is BCB, it needs to be cured at a temperature of about 300° C., and consequently the hot embossing step can be performed at that temperature or higher in order to simultaneously cure the BCB layer. Once cured, BCB acts like a glass and can be heated to substantially higher temperatures (e.g., up to at least 500° C.) without melting, which can facilitate the addition of one or more further layers (including BCB layers).

In various embodiments, the transparent substrate and the polymer layer can have the same, similar, or different refractive indices, depending on the application. In some embodiments, the substrate is a glass substrate, and the polymer is benzocyclobutene (BCB), with equivalent refractive index to glass, allowing the BCB and glass to act as a composite waveguide. In some embodiments, the substrate is a $MgF_2$ substrate (with a refractive index of about 1.3). In other embodiments, the substrate is a $BaF_2$ substrate or a quartz substrate. In some embodiments, the polymer is PolyDiMethylSiloxane (PDMS). Many other suitable transparent substrates and polymers and combinations thereof will be apparent to those skilled in the art in light of this disclosure.

Figure 17:
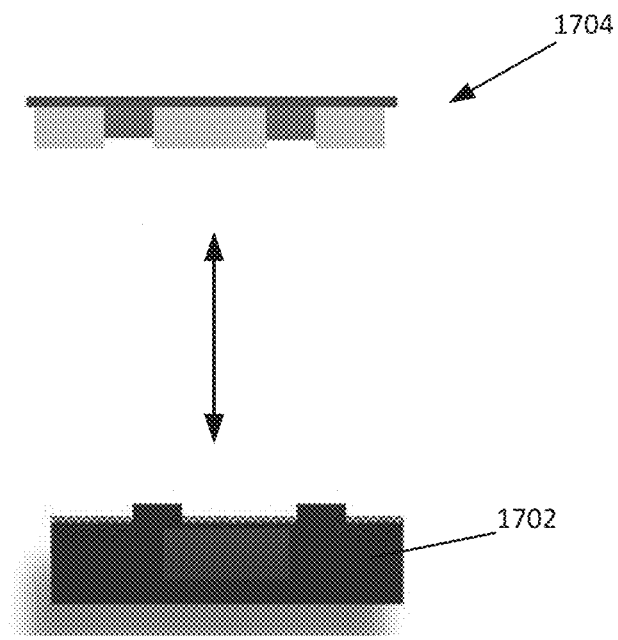
FIG. 17 illustrates a step of the production process of FIG. 7 in which the original opaque substrate is removed from the transparent substrate and partially embedded semiconductor islands.
Figure 18:
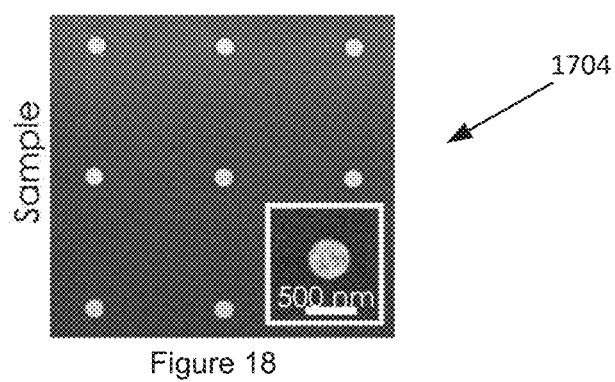
FIGS. 18 and 19 are plan view SEM images of the resulting frequency conversion device and original opaque substrate, respectively.
Figure 19:
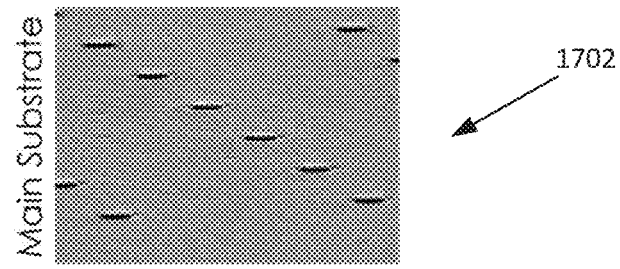

Finally, the remaining portion of the original opaque substrate 1702 is removed by peeling or otherwise pulling it away from the transparent superstrate, as shown in FIG. 17, to provide the frequency conversion device 1704. The $Cl_-$ gas treatment of the opaque substrate surface described above is optional, but the inventors have found that it facilitates this separation by reducing the adhesion of the transparent support to the opaque substrate. FIGS. 18 and 19 are SEM images of the resulting frequency conversion device 1704 and the opaque substrate 1702 (which can be discarded).

The resulting frequency conversion device 1704 is in the form of a two-dimensional array of compound semiconductor islands (in the form of cylinders or 'disks' in this example) partially embedded in a transparent superstrate. Optionally, the semiconductor islands can be completely embedded within the transparent substrate in a variety of different ways, but most simply by adding (e.g., by bonding or forming in situ (e.g., by spin coating and curing)) a second transparent substrate/superstrate to cover the exposed surfaces of the semiconductor islands. Optionally, a second hot embossing step can be performed to remove any gap between the second transparent substrate and the semiconductor islands. A three-dimensional, array of semiconductor islands can be formed by bonding two or more single-layer frequency conversion devices together. The bonding can be achieved by simply arranging a stack of single-layer devices, typically in a wafer alignment tool to determine the relative locations of the islands in different layers, and using the tool to apply heat and pressure to the stack in order to achieve bonding. In some embodiments, different etch mask layouts are used to form the different layers and thus can provide lateral offsets between the islands in different layers, if desired.

Figure 7A:
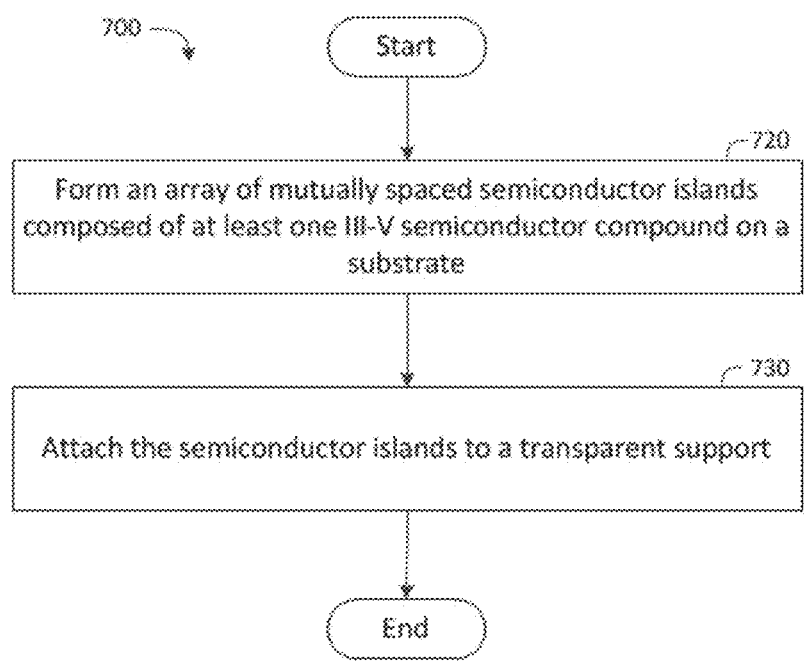
FIG. 7A is a flowchart of an embodiment of a method of manufacturing a frequency conversion device.

FIG. 7A is a flowchart of a method 700 of a method of manufacturing a frequency conversion device. In block 720, method 700 forms, on a substrate, an array of mutually spaced semiconductor islands composed of at least one III-V semiconductor compound. The semiconductor islands of nanometer-scale are configured so that radiation of a first wavelength incident upon the semiconductor islands causes them to emit radiation of a second wavelength shorter than the first wavelength by a nonlinear frequency conversion process. The substrate is substantially opaque to electromagnetic radiation of the second wavelength. In block 730, method 700 attaches the semiconductor islands to a transparent support that is substantially transparent to radiation of the second wavelength to provide a frequency conversion device. The array of mutually spaced semiconductor islands is supported by the transparent support so that radiation of the first wavelength incident upon the frequency conversion device causes it to emit radiation of the second wavelength, and at least the radiation of the second wavelength passes through the transparent support.

Optical Characterization of Non-Linear Electromagnetic Properties

Figure 20:
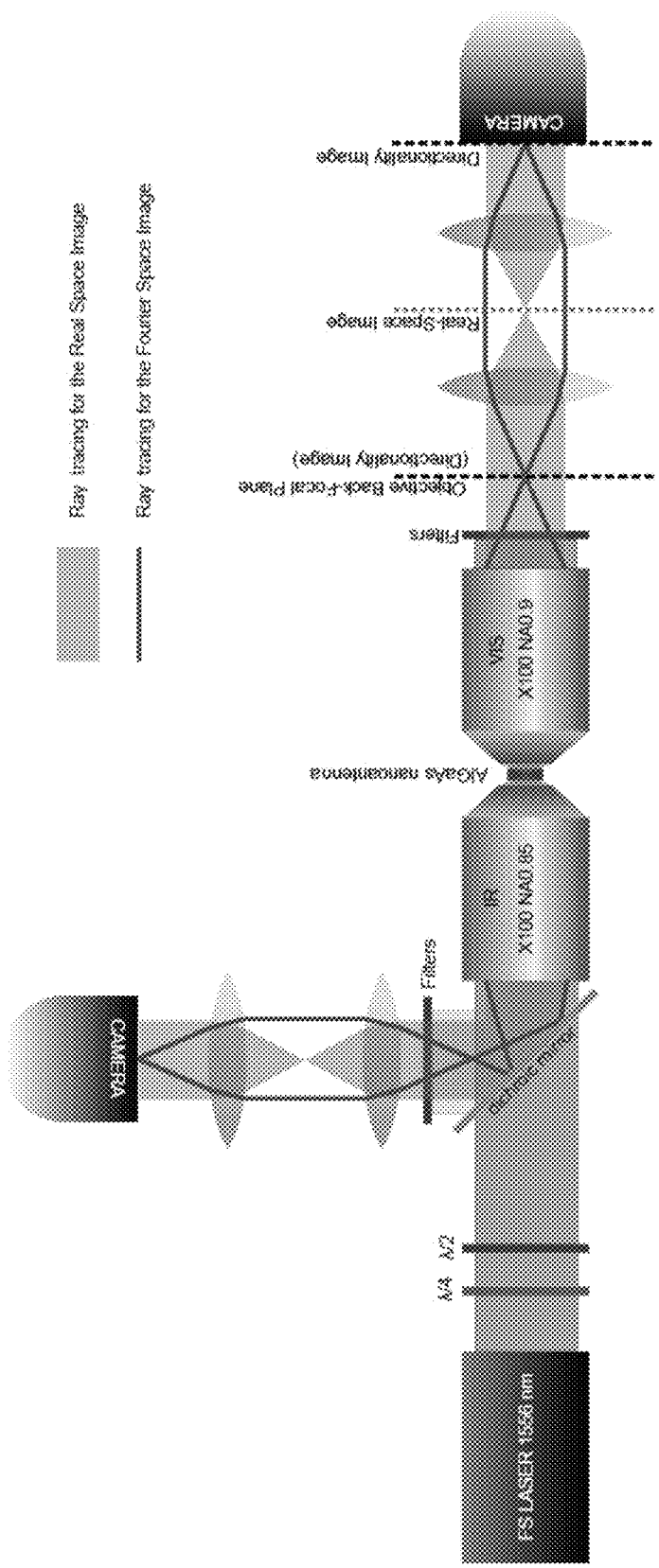
FIG. 20 is a schematic illustration of an experimental arrangement that was used to characterize the optical properties of the semiconductor islands of the frequency, conversion devices.

The electromagnetic behaviors of the manufactured frequency conversion devices and of single islands were characterized using a variety of different optical methods commonly used by researchers in the field. FIG. 20 is a schematic diagram showing an experimental configuration that was used to characterize two-dimensional arrays and individual islands of $Al_{0.2}Ga_{0.8}As$. To measure the non-linear generated output radiation, including second harmonic generation ("SHG"), from individual semiconductor islands, a single island is placed in the focal spot of two confocal air objective lenses: an Olympus LCPlanNIR (0.85 NA, 100×, infrared) for focusing of the FW, and an Olympus MPlanFLN (0.9 NA, 100×, visible) for collection of the output radiation. This corresponds to collection angles for the emission patterns within approximately 58° and 64° in air, which corresponds to collection angles of approximately 44° and 40° in glass and BCB.

The diameter of the focused pump laser beam is measured by performing knife-edge experiments and ensuring that the pump beam is close to a diffraction limit of 2.2 µm. The substrate side faces the visible objective. Thus, the objective lens of the Olympus MPlanFLN collects the output radiation from an individual island in the forward direction, and the Olympus LCPlanNIR lens collects the output radiation in the backward direction. The pump laser is a pulsed $Er^{3+}$-doped fiber laser (~500 fs, repetition rate of 5 MHz) operating at a wavelength of 1556 nm. At the laser output, a quarter-wave plate and a half-wave plate were used to control the output polarization, and two cooled CCD cameras were used to detect the output radiation. In the forward direction, a notch filter blocks the pump laser. In the backward direction, a dichroic mirror is used in front of the objective lens to direct the backward-directed output radiation onto the camera.

Linear Characterization

The extinction spectra of individual AlGaAs nanodisks were measured using the same equipment in a confocal configuration, using a white-light source (fiber-coupled tungsten halogen light bulb) and two spectrometers: a Princeton Instruments Acton SP 2300 monochromator with Andor DU490A-1.7 InGaAs array detector for infrared wavelengths, and an Ocean Optics 65000 for wavelengths in the visible region. Transmission spectra were measured through a disk and a field diaphragm, and the extinction cross-sections were calculated using an approximate relation of ln(1−T), where T is the measured transmission, normalized to the transmission of the substrate.

Figure 22:
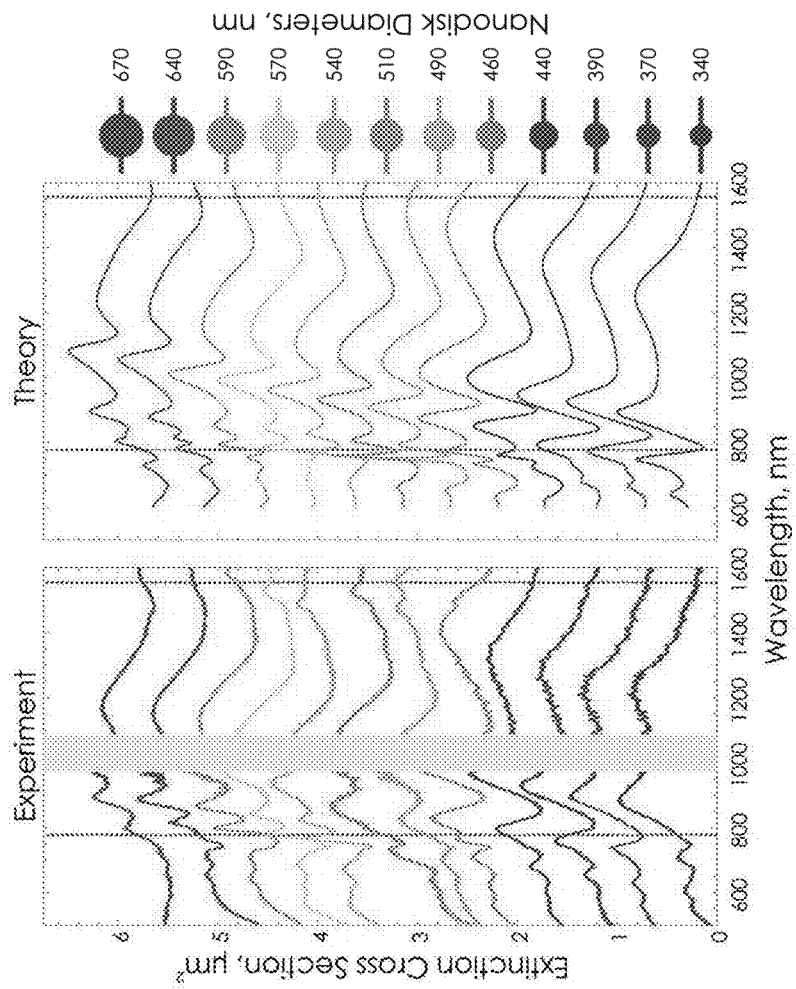
FIG. 22 shows extinction spectra of individual semiconductor islands as measured experimentally and calculated theoretically, respectively, where the different colors correspond to different diameters of the islands, as indicated by the legend, and where the dashed lines show the spectral positions of the incident and the second harmonic frequencies.
Figure 21:
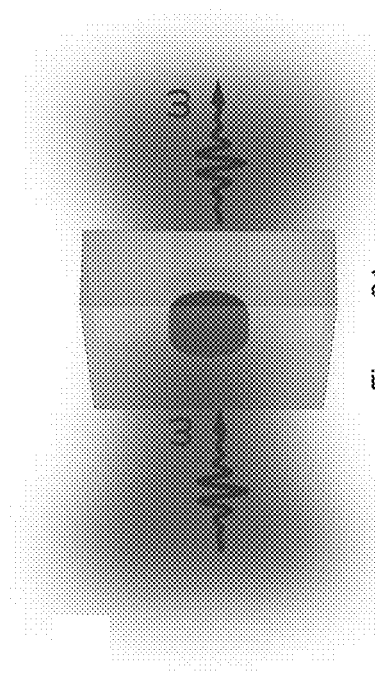
FIG. 21 is a schematic illustration of the linear spectral measurements of the semiconductor islands.

The linear extinction spectra of individual islands was measured in a linear transmission arrangement, as shown schematically in FIG. 21. FIG. 22 includes two graphs: the left-hand graph shows the measured extinction cross-sections as a function of wavelength for semiconductor cylinders of different diameters ranging from 340 to 670 nm and a fixed height of 300 nm, and the right-hand graph shows the corresponding theoretical predictions of the rigorous coupled wave analysis (RCWA) numerical simulation method described in Hugonin, J. P. and Lalanne, P., RETICOLO Code for diffraction by stacks of lamellar gratings, Institut d'Optique, Orsay, France (2005). The two vertical dashed lines in both graphs indicate the fundamental wave ("FW") wavelength and the second harmonic ("SH") wavelength, respectively. The shaded region in the left-hand graph indicates the wavelength range not covered by the spectrometers.

The measurements shown in FIG. 22 demonstrate a pronounced size-dependent resonance at the FW wavelength and multiple resonances at the SH wavelength, and are in good agreement with the numerical simulations shown in the right-hand graph. The discrepancies between the experiments and the theoretical predictions are believed to be due to fabrication imperfections and the finite numerical aperture of the measurement apparatus described above.

Figure 23:
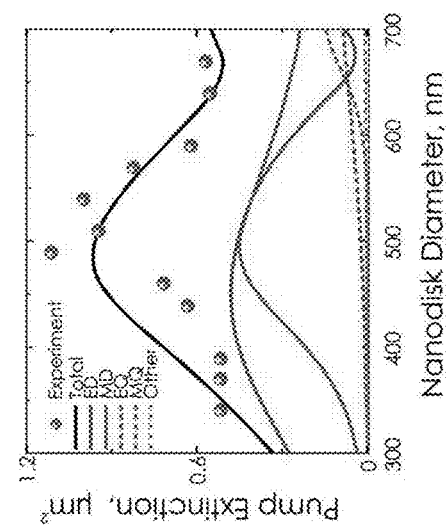
FIG. 23 is a graph of linear extinction and its multipolar decomposition as a function of the diameters of the semiconductor islands at the pump wavelength of 1556 nm, where the black solid line indicates the theoretical calculation, the dots indicate experimental measurements, and the colored lines indicate the multipolar contributions as indicated in the legend.

FIG. 23 shows the extracted scattering cross-sections at the FW as a function of the diameter of the semiconductor islands, where the dots represent experimental results, and the solid curves represent the numerical simulations. Multipolar decomposition was performed using the polarization currents induced inside each semiconductor island, and reveal that the resonant profile of the linear scattering, which is maximal for disk diameters of 400-500 nm, is essentially determined by a magnetic dipole excitation ("MD") and an electric dipole excitation ("ED") in each island, playing a dominant role at the pump FW wavelength (1556 nm). Some minor contributions of quadrupoles tend to grow slightly when the disk diameter is increased.

Figure 33:
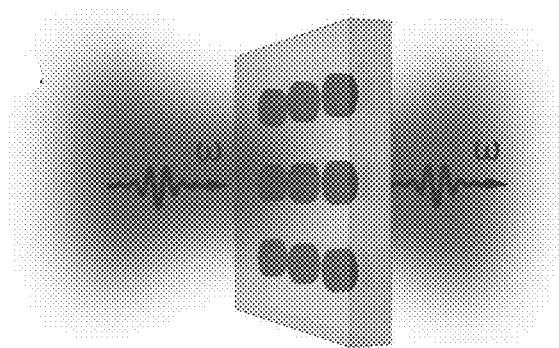
FIG. 33 is a schematic illustration of the transmission measurements of an array of semiconductor islands.
Figure 34:
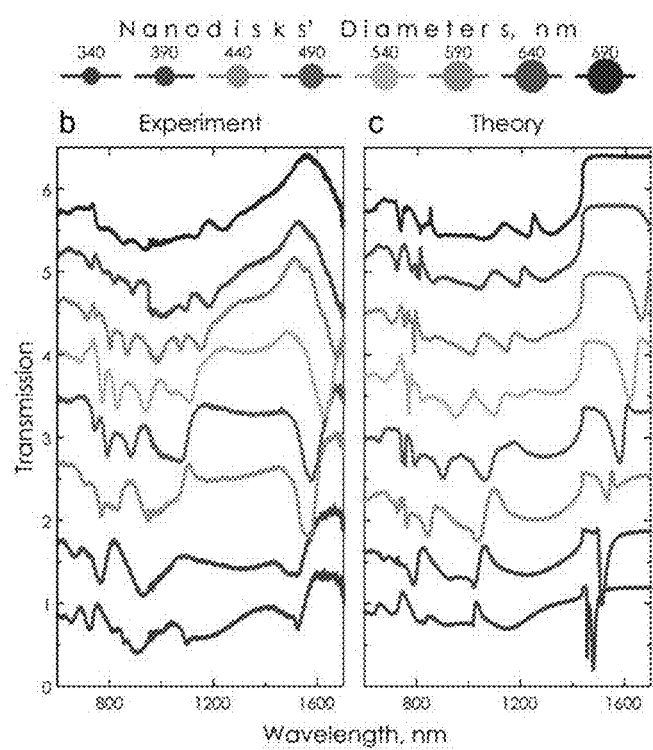
FIG. 34 includes transmission spectra of semiconductor island arrays as measured experimentally and calculated theoretically, respectively, where different colors correspond to different island diameters, as indicated by the legend.

The linear measurements applied to single semiconductor islands as shown in FIGS. 21 and 22 were also applied to 100 µm×100 µm arrays of the islands, as represented schematically in FIG. 33, to produce the measured and simulated zero-order forward scattering spectra shown in FIG. 34 for a variety of island diameters. As with the single island measurements, the experimentally measured spectra are in good agreement with numerical calculations.

Second Harmonic Generation

It is noted that the highest extinction is achieved when the amplitudes of the electric dipole and magnetic dipole become equal. In other words, the highest extinction is observed for islands that satisfy the generalized Kerker condition. At the SH wavelength (778 nm), higher-order multipoles are excited in the islands. These two resonant conditions at the FW and the SH wavelengths are responsible for SHG enhancement in the islands. However; a more-sophisticated dependence of the SHG efficiency on the sizes of the semiconductor islands is expected when the spatial overlaps of the resonant modes at the FW and the SH fields are taken into account. These results suggest that there are optimal sizes of individual islands to maximize the efficiency of SHG from single islands.

The nonlinear response of individual islands supported by transparent supports was measured in both forward and backward directions (relative to the incident radiation) for various island diameters, using linear (vertical) polarization of the pump laser at a 45° angle of incidence relative to the crystalline axes of the islands; as shown in FIG. 23, in order to maximize the non-linear tensor component.

A laser beam with an average beam power of ~1 mW is focused by an infrared wavelength objective (NA=0.85) to a diffraction limited spot of 2.2 µm, resulting in a peak intensity of ~7 $GW/cm^2$. Another visible wavelength objective (NA=0.9) collects the SH emitted by the semiconductor island in a forward direction, while the focusing objective collects the SH radiation in a backward direction. The SH signal is detected by the two cooled CCD cameras, calibrated with a power meter.

The results of the SHG measurements from single $Al_{0.2}Ga_{0.8}As$ islands of different diameters are shown in FIG. 24 as values of SHG efficiency derived from the sum of the measured forward and backward SH signals. The overall dependence of the efficiency on the island size is complex due to the large number of higher-order modes that exist in the SH frequency band. The most efficient SHG is observed for the island with a diameter of 490 nm, having a conversion efficiency as high as $8.5 \times 10^{-5}$.

Importantly, as shown in FIG. 25, the directionality of the second harmonic emission can be determined by selecting the dimensions of the semiconductor island. For example, for cylindrical island diameters of about 400 nm, the SH radiation is mostly backward, while for diameters of 500-600 nm, the backward-to-forward ratio remains close to unity, with a slight domination of the backward SET emission. At larger disk diameters, the backward-to-forward ratio peaks again; however, for these larger disks, the dependence becomes very sensitive to the island diameter due to the many higher-order multipoles that contribute to the SH scattering. The SH efficiency (FIG. 24) and backward-to-forward ratio (FIG. 25) are both generally sensitive to the geometry of the semiconductor islands. In particular, geometrical parameters can be tuned to bring high efficiency in overlap with comparable backward-to-forward ratio (as shown). Additionally, it is possible to simultaneously achieve high efficiency and unidirectionality.

An important feature of the measurements is that the SH radiation pattern can be characterized in both forward and backward directions as well as in transverse momentum space. The data, however, suggest that the experimental measurement apparatus is capturing only a small portion of the total SH radiated power due to the finite numerical apertures of the objectives.

To estimate the total efficiency of the radiated SH power, the nonlinear response of the semiconductor islands was simulated numerically using the finite element method solver in COMSOL Multiphysics in the frequency domain. In these simulations, each semiconductor island is assumed to be embedded in a homogeneous medium having a refractive index equal to that of the glass substrate. The material dispersion of the compound semiconductor is taken from COMSOL tabulated data. The second-order nonlinear susceptibility tensor of the [100] oriented. $Al_{0.2}Ga_{0.8}As$, possessing a zinc blende crystalline structure, contains only off-diagonal elements $X_{ijk}^{(2)}$ with $i \neq j \neq k$. Thus, in the principal-axis system of the crystal, the ith component of the nonlinear polarization at the SH frequency is given by:

$$P_i^{(2\omega)} = \varepsilon_0 X_{ijk}^{(2)} E_j^{(\omega)} E_k^{(\omega)} \quad (1)$$

An undepleted pump approximation is assumed and two coupled steps are used to calculate the radiated SH power. First, linear scattering at the fundamental wavelength is simulated. To emulate the experimental conditions more accurately, the semiconductor island is excited by a focused monochromatic Gaussian beam, polarized along the [110] direction. The bulk nonlinear polarization given by Eq. 1, induced inside the island, is then employed as a source for the next electromagnetic simulation at twice the frequency, to obtain the generated SH field.

Figures 27, 28, 29, 30:
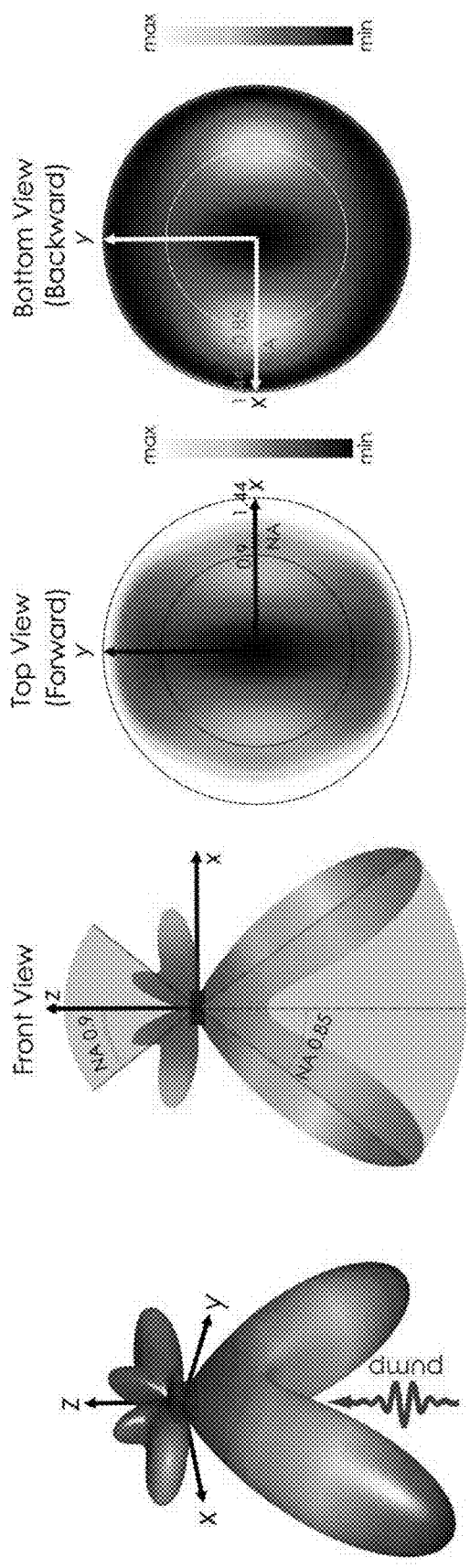
FIGS. 27 to 30 respectively show a calculated 3D pattern of far-field SH radiation, and front top and bottom views of the pattern, where the cones and inner circles indicate the experimentally accessible range of angles.

The disk size providing the maximum SH (d=490 nm) was chosen, and the three-dimensional SH far-field radiation pattern was calculated, as shown in FIG. 26. The non-linear scattering is governed by the interference of an electric quadrupole and higher-order nonlinearly generated multipoles (up to l=4), leading to the suppression of the forward SH radiation, as shown in FIG. 26. The side, top, and bottom views of this same radiation pattern are shown in FIGS. 27 to 29, respectively. The shaded area in FIG. 27 depicts the forward and backward collection angles of the SH signal in the experimental configurations described above. These collection angles are also indicated by the inner circles in the forward and backward far-field radiation images in FIGS. 28 and 29. Clearly, the energy collected in the experiment is less than the total generated. SH. By integrating the amount of SR emitted within the numerical aperture of the objective lenses, it is estimated that only about 30% of the total SR energy is experimentally collected in the forward and backward directions. As such, the total generation efficiency is estimated to be three times larger than the measured collection efficiency, thus exceeding the prior art record value of $10^{-4}$. This high efficiency provides a solid ground for the use of the nonlinear semiconductor arrays described herein as functional elements for beam and polarization shaping.

The radiation patterns are measured by building back-focal plane (BFP) images of the SU radiation pattern by adding a pair of confocal lenses between the objective lenses and the cameras, in both forward and backward directions. The top left images in FIGS. 30 and 31 respectively show the radiation diagram captured by the objective lenses on the basis of their numerical aperture in forward (FIG. 31) and backwards (FIG. 32) directions. From these BFP images, it can be concluded that the SH radiation in the normal directions (the (0,0) point of the BFP images) is zero, as recently predicted theoretically. Zero SH emission in normal directions here originates from the symmetry of the nonlinear bulk $\chi^{(2)}$ tensor, and is therefore insensitive to geometry. As a result, zero SH emission is observed for all of the semiconductor islands that were fabricated as described above.

Third Harmonic Generation

Figure 35:
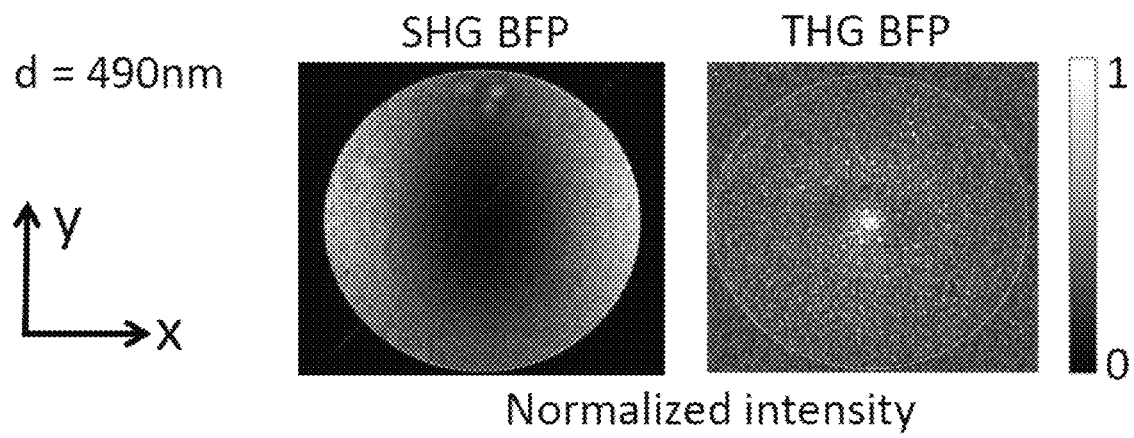
FIG. 35 includes experimentally measured backward back focal plane images of second and third harmonic generation from an AlGaAs semiconductor island with a 490 nm diameter.

To further support these findings, third harmonic generation ("THG") from the same islands was measured. The third harmonic relies on the $\chi^{(3)}$ nonlinear tensor, and in contrast to the SH radiation pattern has a radiation maximum in normal directions. Although the third-order nonlinear term of $Al_xGa_{(1-x)}As$ non-linear polarization is much weaker than the second-order non-linear term, it is nevertheless non-zero, and third harmonic generation (TUG) signals from $Al_xGa_{(1-x)}As$ islands can be observed. The THG is expected to be similar to the THG from other well-studied materials like silicon and germanium. Therefore, in terms of the radiation pattern, the THG signals are non-zero in the direction normal to the disks axis. This characteristic is in contrast to the SHG radiation pattern, which is reflected in the doughnut shape of back-focal plane (BFP) images because of zero diagonal components of the second-order tensors. This difference is clear from the forward and backward normalized intensity images shown in FIG. 35, demonstrating that the measured doughnut shapes of SHG are indeed characteristic of the SH emission.

This is an important finding for arrays of the semiconductor islands, because the interference of emission from multiple islands of an array will result in lower radiation efficiency from the zeroth order SH beam. It is also noted that surface second-order nonlinearities can in principle result in normal SH radiation for specific excitation; however, surface SHG is not pronounced in these experiments, and the bulk $\chi^{(2)}$ is the dominant nonlinear contribution.

Polarization Properties of the Second Harmonic

Figure 36:
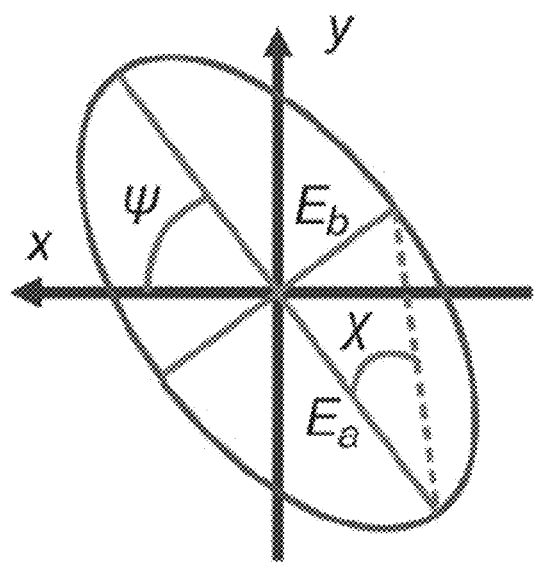
FIG. 36 is a schematic illustration of the polarization ellipse with the Stokes coefficients of ellipticity X angle and polarization-inclination angle $\psi$, where $E_a$ and $E_b$ are the main polarization axes (solid blue lines) of the polarization ellipse.

Even more intriguing is the polarization state of the observed far-field doughnut beam. To test the polarization properties of the SH radiation from the semiconductor islands, the spatially resolved polarization states of the BFP images were retrieved using the Stokes formalism. The Stokes coefficients provide a complete description of the light polarization state in terms of its total intensity $I_{tot}$, (fractional) degree of polarization ρ, polarization inclination angle ψ, and the ellipticity angle X The ellipticity tan(X) is defined as the ratio of the two axes of the polarization ellipse (see FIG. 36), and the polarization inclination is described by the angle between the main polarization axis and the x-axis of the laboratory coordinate system.

Figure 37:
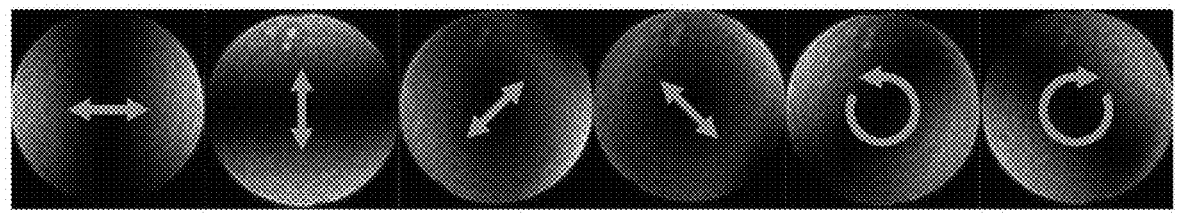
FIG. 37 includes back-focal plane images of second harmonic signals in a backward direction after transmission through six different polarizers: linear horizontal, vertical, two diagonal and two circular.

Experimentally, the Stokes parameters are found by measuring light transmission through a set of six different polarizers: linear horizontal, vertical, two diagonal and two circular polarizers realized by different orientations of the quarter-wave plate and a linear polarizer. The set of measurements for the backward directionality of SH emission from a disk with diameter of 490 nm are shown in FIG. 37.

The next step is to retrieve the Stokes vector $$M = \begin{bmatrix} I \\ Q \\ U \\ V \end{bmatrix},$$

where $I = H+V = D_a+D_b = L+R$ $Q = H-V$ $U = D_a - D_b$ $V = L - R$

Here, H is the transmission through horizontal polarizer, while V, $D_a$, $D_b$, L, R are the transmissions through vertical, two diagonal, left- and right-circular polarizers, respectively.

Figure 38:
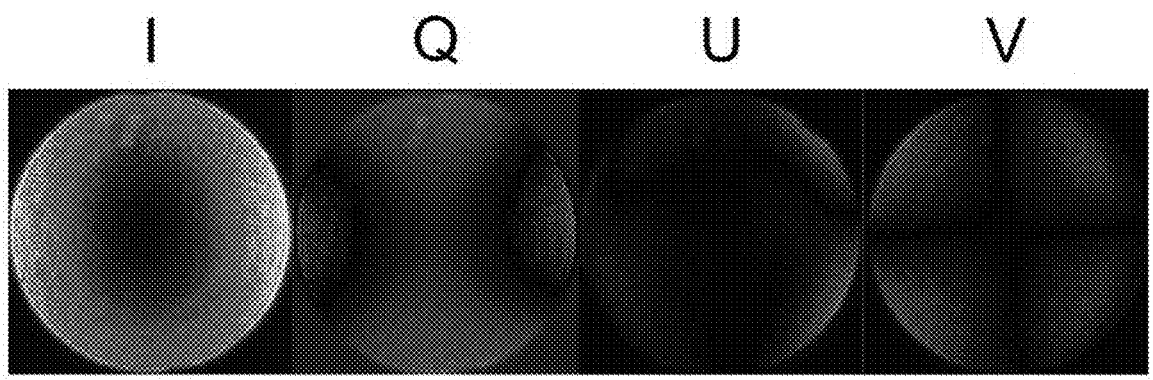
FIG. 38 shows four components of the Stokes vector for backward directionality of the second harmonic signal.

A set of four back-focal plane images forming the Stokes vector are shown in FIG. 38.

Next, the coefficients are calculated as follows:

$$\rho = \frac{\sqrt{Q^2 + U^2 + V^2}}{I}$$

$$\psi = \frac{1}{2}\arg(Q + iU)$$

$$\chi = \frac{1}{2}\arctan\left(\frac{V}{\sqrt{U^2 + Q^2}}\right)$$

Figure 39:
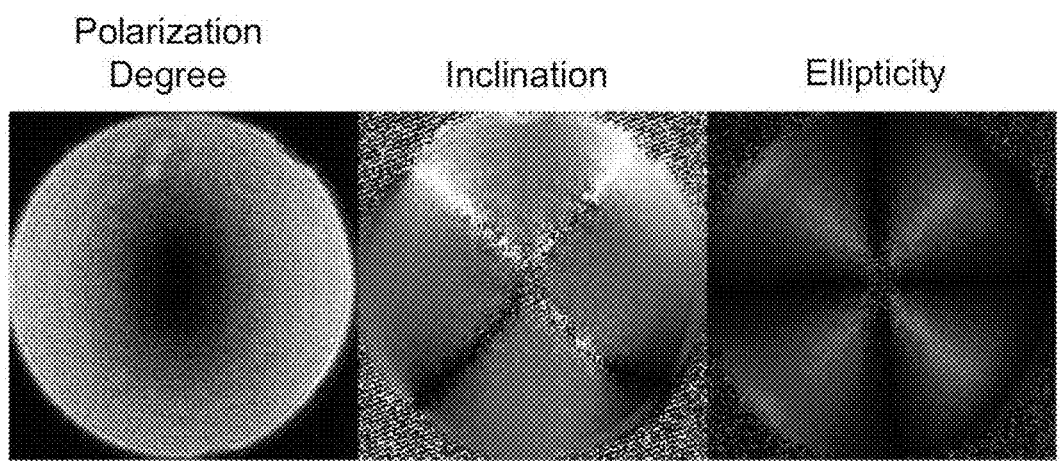
FIG. 39 shows the retrieved spatially-resolved degree of polarization, inclination and ellipticity.

The resulting coefficients are shown in FIG. 39.

Figure 31:
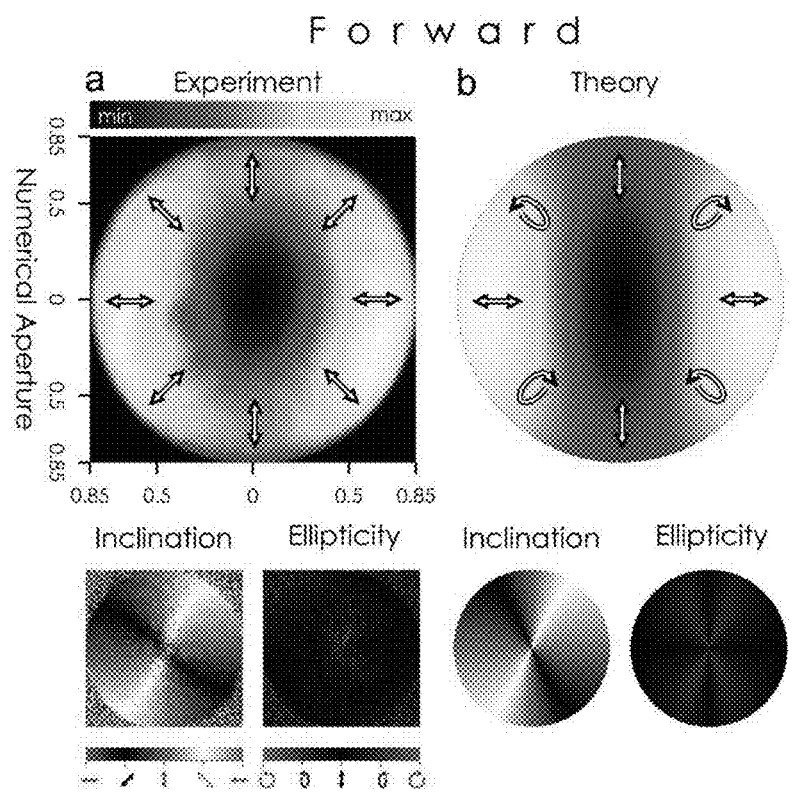
FIG. 31 includes directionality (top row) and polarization (bottom row) diagrams of the SH signal in a forward direction, as measured experimentally and as calculated theoretically, where the arrows visualize the polarization states, and the incident beam is linearly polarized along the vertical direction.
Figure 32:
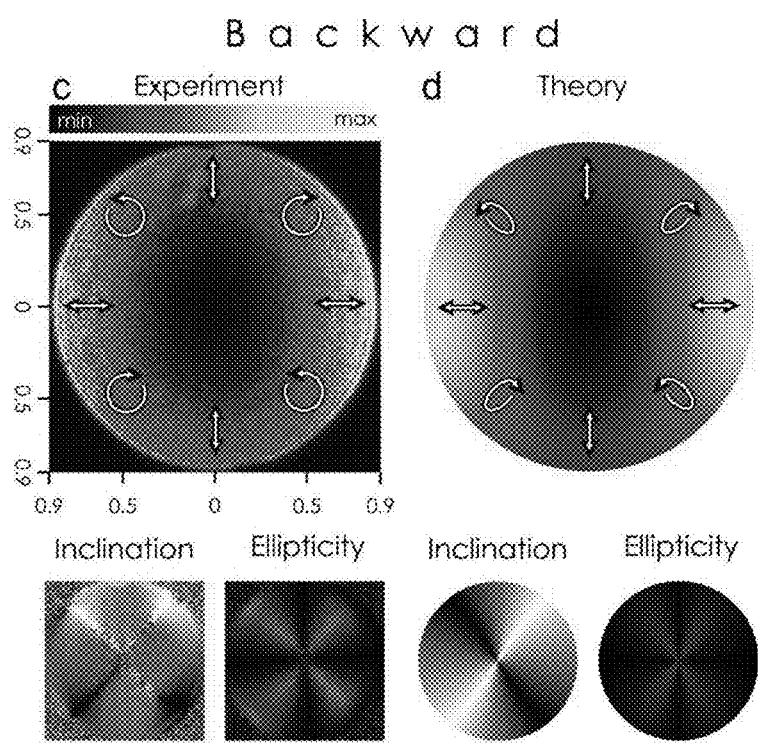
FIG. 32 is the same as FIG. 31, but for a backward direction.

We observe vector-beam formation at the SH frequency, as shown with arrows in FIGS. 31 and 32. In particular, nearly perfect radial polarization of the SH can be observed in the forward direction. In the backward direction, the polarization state is more complex, with polarization inclination having radial structure and ellipticity ranging from nearly circular to linear, as shown in FIG. 32. The polarization of the SR beam was calculated mimetically, and is shown in the top tight-hand images in FIGS. 31 and 32. Some differences between theory and experiment can be observed. These differences can be attributed to the slight non-uniformity of the device, in particular because the BCB does not fully cover the semiconductor islands.

The nonlinear generation of vector beams from the semiconductor islands can be intuitively understood by the excitation of Mie-type multipoles at the wavelengths of the input and output radiation. In the simplest exemplary case, a vector beam of radial polarization can be emitted by an electric dipole oriented along the optical axis of the disk antenna. In a more complex situation, as in the examples described herein, higher-order multipoles are excited at the SH wavelength. The superposition of these multipolar contributions governs the output polarization state. This can be engineered for a specific application.

The radiation patterns and polarization states of SH emission from the compound semiconductor islands described above demonstrate that nonlinear conversion efficiencies exceeding $10^{-4}$ can be achieved, so the described nanostructures can be applied used to provide functional nonlinear devices at the nanoscale. In particular, nonlinear nanoscale light sources emitting vector beams with a desired polarization state, e.g., radial polarization, have been experimentally demonstrated. These results open new avenues for novel nonlinear imaging, as well as applications such as bright fluorescent markers for bio-imaging, or constituent elements for efficient nonlinear holograms (which can be used as security devices, for example).

Figure 40:
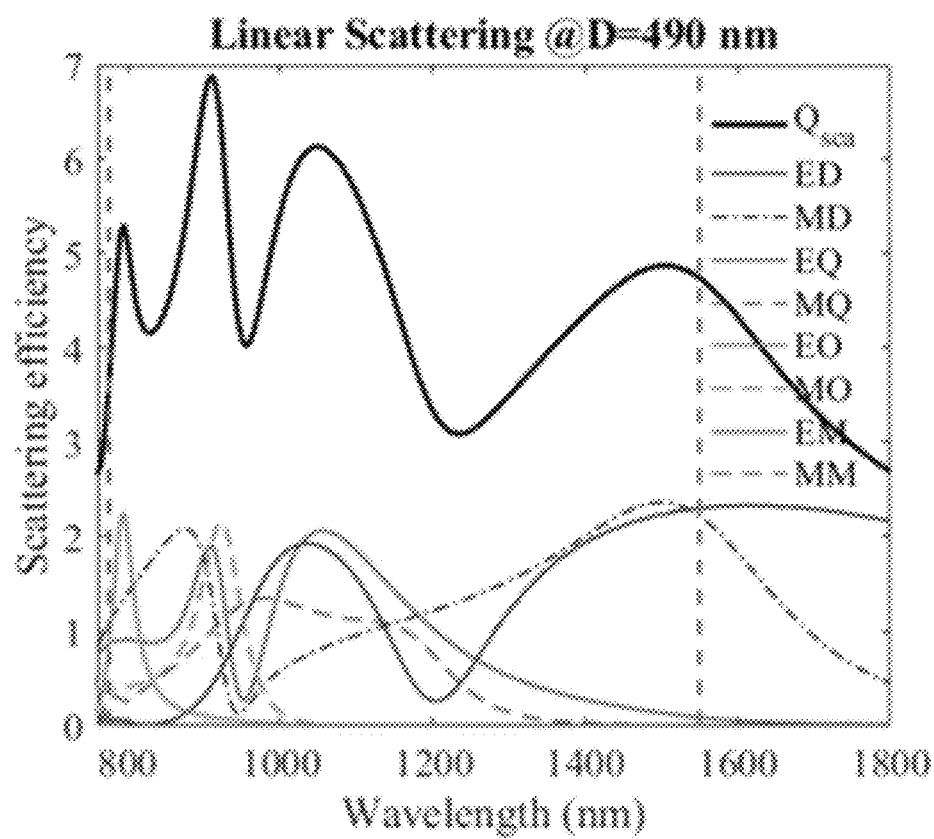
FIG. 40 is a graph of calculated scattering efficiency and multipole decomposition (up to fourth order) for AlGaAs semiconductor island with a diameter of 490 nm, and where the pump is set to be a plane wave polarized along the x axis.

Multipolar decomposition of these spectra supports the attribution of the observed spectral resonances in the linear regime to excitation of Mie-type multipoles. Polarization currents were used for this task, and the island parameter that provided the best performance was 490 nm, with corresponding results shown in FIG. 40.

Figure 41:
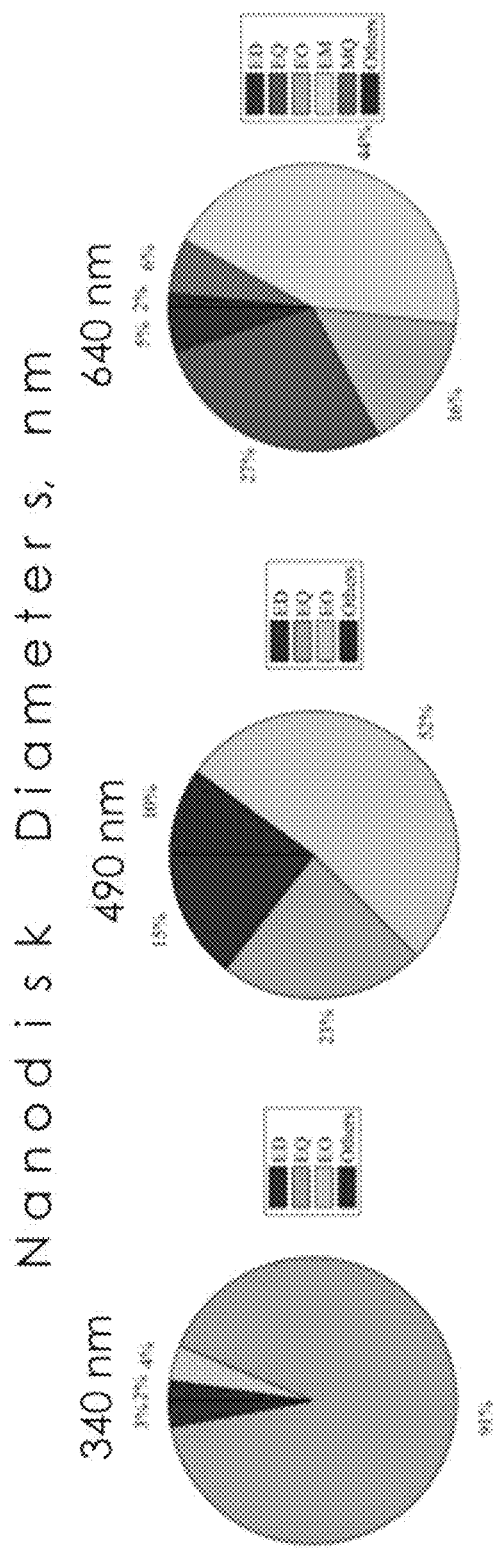
FIG. 41 includes three pie charts of the SH multipolar contributions calculated for three different island diameters: 340 nm (left), 490 nm (center), and 640 nm (right).

Multipolar decomposition in the non-linear regime of SH fields was also performed, for cylindrical islands with diameters of 340 nm, 490 nm and 640 nm. The relative contributions of different multipoles into the SH for these three diameters are shown in the respective pie charts of FIG. 41.

Figure 42:
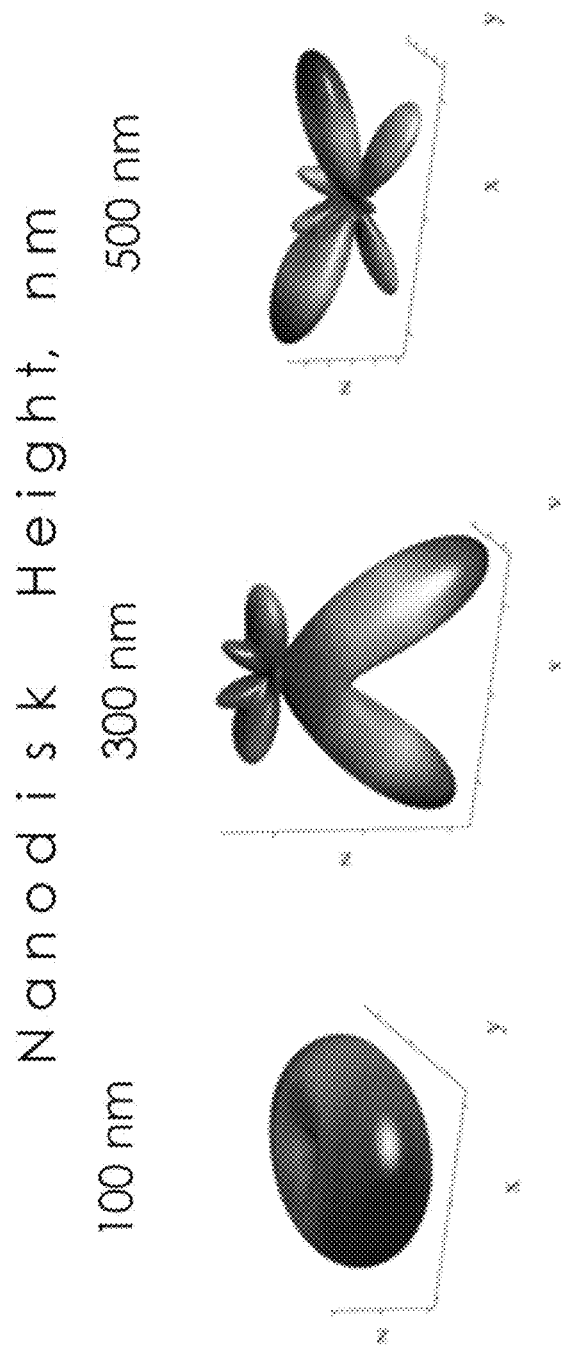
FIG. 42 shows the calculated SH directionality for an island diameter of 490 nm and an island height of 100, 300, and 500 nm, respectively.

The strong dependence of SH directionality on cylindrical island height is demonstrated by the directionality diagrams of FIG. 42 for cylindrical semiconductor islands of 490 nm diameter and heights of 100 nm, 300 nm and 500 nm.

Figure 43:
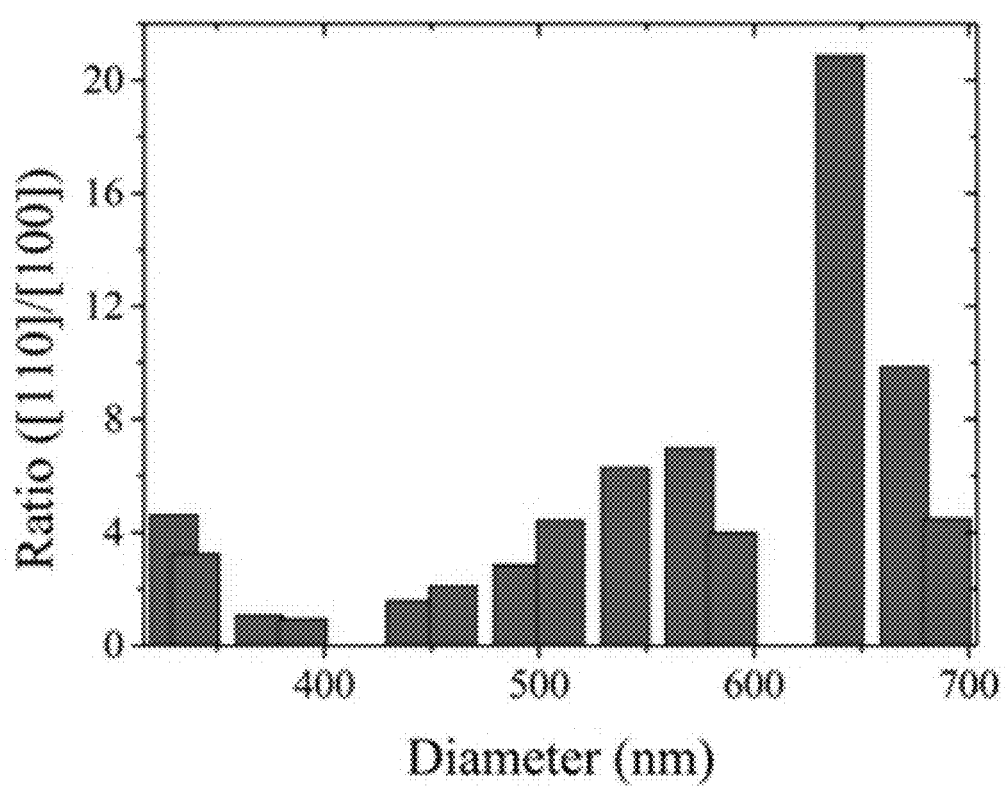
FIG. 43 is a bar chart of the efficiency of second harmonic generation polarization orientation with respect to the crystalline axis as a function of island diameter.

The strong dependence of SH efficiency on the relative orientation of the in-plane crystalline axis to the orientation of pump polarization is shown in FIG. 43.

Figure 44:
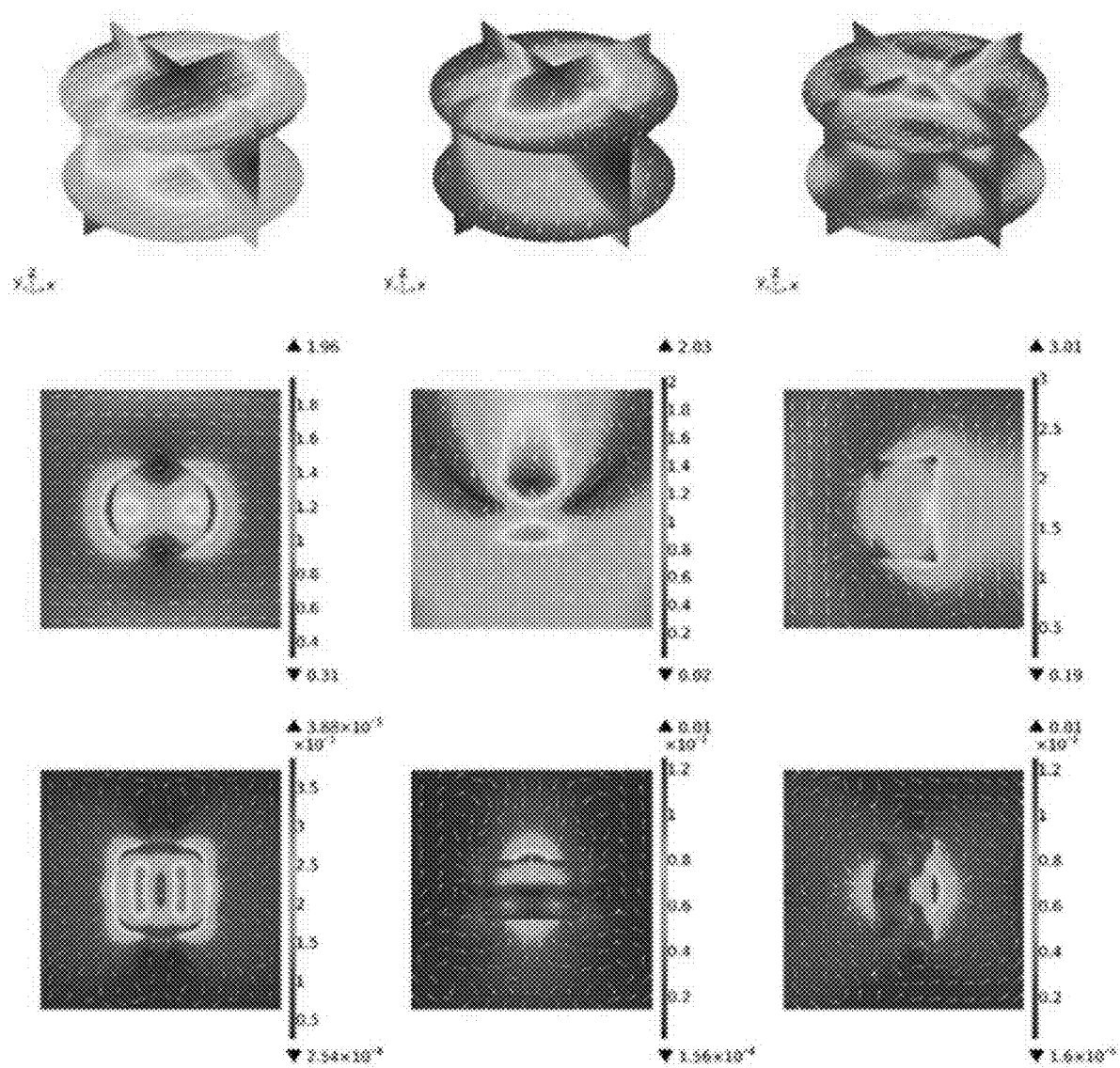
FIG. 44: First row: spatial profiles of the fundamental field (left), induced nonlinear current (center), and second-harmonic field (right) inside a semiconductor island of 490 nm diameter; near-field distributions of the fundamental (second row) and SH (third row) fields shown in three different cross-sections.

Finally, distributions of the near-fields at both the pump wavelength and the second harmonic wavelength are shown in FIG. 44.

Many modifications will be apparent to those skilled in the art without departing from the scope of the disclosed technology.

The various features and processes described herein may be implemented independently of one another, or may be combined in various ways. All possible combinations and sub combinations are intended to fall within the scope of this disclosure. In addition, certain methods or process blocks may be omitted in some implementations. The methods and processes disclosed herein are also not limited to any particular sequence, and the blocks or states relating thereto can be performed in any other sequences that are appropriate. For example, described blocks or states may be performed in an order other than that specifically disclosed, or multiple blocks or states may be combined in a single block or state. The example blocks or states may be performed in serial, in parallel, or in some other manner as appropriate. Blocks or states may be added to or removed from the disclosed example embodiments as suitable. The example systems and components described herein may be configured differently than described. For example, elements may be added to, removed from, or rearranged compared to the disclosed example embodiments. Various embodiments can apply different techniques for fabricating different types of electronic devices.

Aspects of this disclosure can be implemented in various devices. For example, the frequency conversion devices discussed herein can be implemented in night vision glasses, thermal imagers, cameras, imaging systems, medical sensors, laboratory equipment, augmented reality systems, portable computing devices, or any other suitable application that could benefit from any of the principles and advantages discussed herein.

While certain embodiments have been described, these embodiments have been presented by way of example only, and are not intended to limit the scope of the disclosure. Indeed, the novel devices, systems, apparatus, methods, and systems described herein may be embodied in a variety of other forms; furthermore, various omissions, substitutions and changes in the form of the methods and systems described herein may be made without departing from the spirit of the disclosure. For example, while blocks are presented in a given arrangement, alternative embodiments may perform similar functionalities with different components and/or circuit topologies, and some blocks may be deleted, moved, added, subdivided, combined, and/or modified. Each of these blocks may be implemented in a variety of different ways. Any suitable combination of the elements and acts of the various embodiments described above can be combined to provide further embodiments.

What is claimed is:

1. A frequency conversion device, comprising:
an array of mutually spaced semiconductor islands, composed of at least one III-V semiconductor compound epitaxially grown on a substrate which is subsequently removed from semiconductor islands, the semiconductor islands of nanometer-scale and configured so that electromagnetic radiation of a first wavelength incident upon the semiconductor islands causes them to emit electromagnetic radiation of a second wavelength shorter than the first wavelength by a nonlinear frequency conversion process via photonic Mie resonances at the first and/or second wavelengths, and wherein the substrate is opaque to electromagnetic radiation of the second wavelength; and
a transparent support supporting the semiconductor islands, the transparent support being transparent to radiation of the second wavelength to provide a frequency conversion device, wherein the array of mutually spaced semiconductor islands is supported by the transparent support so that radiation of the first wavelength incident upon the frequency conversion device causes the frequency conversion device to emit radiation of the second wavelength, at least the radiation of the second wavelength passes through the transparent support.

2. The frequency conversion device of claim 1, wherein the semiconductor islands are at least partially embedded in the transparent support.

3. The frequency conversion device of claim 2, wherein the transparent support comprises a transparent substrate attached to a layer of a transparent material in which the semiconductor islands are at least partially embedded.

4. The frequency conversion device of claim 3, wherein the transparent substrate and the transparent material are both transparent to radiation of the first wavelength and to radiation of the second wavelength.

5. The frequency conversion device of claim 4, wherein the refractive index of the transparent substrate is equal to the refractive index of the transparent material.

6. The frequency conversion device of claim 4, wherein the refractive index of the transparent substrate is different to the refractive index of the transparent material.

7. The frequency conversion device of claim 3, wherein the transparent substrate is a glass or $MgF_2$ or $BaF_2$ substrate, and the transparent material is a polymer.

8. The frequency conversion device of claim 1, wherein the radiation of the second wavelength is simultaneously emitted in a forward direction and a backward direction relative to the direction of incidence of the radiation of the first wavelength.

9. The frequency conversion device of any claim 1, wherein the radiation of the first wavelength is infrared radiation, and wherein the radiation of the second wavelength is visible light.

10. The frequency conversion device of claim 1, wherein the semiconductor islands are in the form of cylinders with diameters and/or heights of the order of hundreds of nanometers.

11. A night vision device comprising the frequency conversion device of claim 1.

12. A method of manufacturing a frequency conversion device, the method comprising:
forming, on a substrate, an array of mutually spaced semiconductor islands composed of at least one III-V semiconductor compound epitaxially grown on the substrate, the semiconductor islands of nanometer-scale and configured so that radiation of a first wavelength incident upon the semiconductor islands causes them to emit radiation of a second wavelength shorter than the first wavelength by a nonlinear frequency conversion process via photonic Mie resonances at the first and/or second wavelengths, and wherein the substrate is opaque to electromagnetic radiation of the second wavelength;
attaching the semiconductor islands to a transparent support that is transparent to radiation of the second wavelength to provide a frequency conversion device, wherein the array of mutually spaced semiconductor islands is supported by the transparent support so that radiation of the first wavelength incident upon the frequency conversion device causes the frequency conversion device to emit radiation of the second wavelength, and at least the radiation of the second wavelength passes through the transparent support; and
removing the substrate from the semiconductor islands.

13. The method of claim 12, wherein the step of attaching the semiconductor islands to the transparent support includes at least partially embedding the semiconductor islands in the transparent support.

14. The method of claim 13, wherein the transparent support comprises a transparent substrate attached to a layer of a transparent material in which the semiconductor islands are at least partially embedded.

15. The method of claim 14, wherein the transparent substrate is a glass or $MgF_2$ or $BaF_2$ substrate, and the transparent material is a polymer.

16. The method of claim 14, wherein the transparent substrate and the transparent material are both transparent to radiation of the first wavelength and to radiation of the second wavelength.

17. The method of claim 14, wherein the refractive index of the transparent substrate is equal to the refractive index of the transparent material.

18. The method of claim 14, wherein the refractive index of the transparent substrate is different from the refractive index of the transparent material.

19. The method of claim 12, wherein the radiation of the first wavelength is infrared radiation, and the radiation of the second wavelength is visible light.

20. The method of claim 12, wherein the semiconductor islands are in the form of cylinders with diameters and/or heights of the order of hundreds of nanometers.

21. The method of claim 12, wherein the radiation of the second wavelength is simultaneously emitted in a forward direction and a backward direction relative to the direction of incidence of the radiation of the first wavelength.

22. A method of frequency conversion, comprising:
directing radiation of a first wavelength onto an array of mutually spaced III-V compound semiconductor islands supported by a transparent support to cause the array to emit radiation of a second wavelength shorter than the first wavelength by a nonlinear frequency conversion process via photonic Mie resonances at the first and/or second wavelengths,
wherein the array of mutually spaced semiconductor islands is epitaxially grown on a substrate which is subsequently removed from semiconductor islands,
wherein the semiconductor islands have a nanometer-scale,
wherein the substrate is opaque to electromagnetic radiation of the second wavelength,
wherein the transparent support is transparent to radiation of the second wavelength to provide a frequency conversion device,
wherein the array of mutually spaced semiconductor islands is supported by the transparent support so that radiation of the first wavelength incident upon the frequency conversion device causes the frequency conversion device to emit radiation of the second wavelength, and
wherein at least the radiation of the second wavelength passes through the transparent support.

* * * * *